US007871048B2

(12) United States Patent
Sculler et al.

(10) Patent No.: US 7,871,048 B2
(45) Date of Patent: Jan. 18, 2011

(54) FLAT PANEL DISPLAY MOUNTING SYSTEM

(75) Inventors: Steven J. Sculler, Morganville, NJ (US); Michael P. Zambelli, Basking Ridge, NJ (US); Jimmy An, South Plainfield, NJ (US); In-Young Jang, Ridgefield, NJ (US)

(73) Assignee: Bell'O International Corp., Morganville, NJ (US)

( * ) Notice: Subject to any disclaimer, the term of this patent is extended or adjusted under 35 U.S.C. 154(b) by 870 days.

(21) Appl. No.: 11/648,720

(22) Filed: Dec. 28, 2006

(65) Prior Publication Data
US 2008/0156949 A1 Jul. 3, 2008

(51) Int. Cl.
*A47B 96/06* (2006.01)
(52) U.S. Cl. ............. 248/220.21; 248/214; 248/220.42; 248/222.52
(58) Field of Classification Search .................. 248/362, 248/551, 288.11, 291.1, 316.8, 201, 917, 248/919, 924
See application file for complete search history.

(56) References Cited

U.S. PATENT DOCUMENTS

| 6,102,348 | A | 8/2000 | O'Neill |
| 6,402,109 | B1 | 6/2002 | Dittmer |
| 6,418,010 | B1 * | 7/2002 | Sawyer ................. 361/679.05 |
| 6,431,511 | B1 * | 8/2002 | Pfister ..................... 248/274.1 |
| D489,377 | S | 5/2004 | van Kuijk |
| D493,800 | S | 8/2004 | Pfister et al. |
| D494,596 | S | 8/2004 | Pfister |
| D517,085 | S | 3/2006 | Deuschle |
| 7,063,295 | B2 | 6/2006 | Kwon |
| D528,901 | S | 9/2006 | David |
| D530,595 | S | 10/2006 | Lam et al. |
| D532,290 | S | 11/2006 | David |
| 7,152,836 | B2 | 12/2006 | Pfister et al. |
| 7,175,152 | B2 | 2/2007 | Dittmer |
| 7,178,775 | B2 | 2/2007 | Pfister et al. |
| D538,140 | S | 3/2007 | Ly Hau et al. |
| D538,141 | S | 3/2007 | Stenhouse et al. |

(Continued)

FOREIGN PATENT DOCUMENTS

WO   WO-2004/092594 A2   10/2004

(Continued)

OTHER PUBLICATIONS

International Search Report, PCT/US2007/026168.

(Continued)

*Primary Examiner*—Terrell Mckinnon
*Assistant Examiner*—Erin Smith
(74) *Attorney, Agent, or Firm*—Lerner, David, Littenberg, Krumholz & Mentlik, LLP

(57) ABSTRACT

A television mounting system includes a wall plate, at least one monitor arm mountable on the wall plate, and a locking element permanently connected with the wall plate and being movable between an unlocked position for enabling dismounting of the at least one monitor arm from the wall plate and a locked position for preventing dismounting of the at least one monitor arm from the wall plate. The locking element may be pivotally attached to the wall plate for pivoting between the unlocked and locked positions. The at least one monitor arm cannot be removed from the wall plate when the locking element is in the locked position.

34 Claims, 20 Drawing Sheets

U.S. PATENT DOCUMENTS

| | | | |
|---|---|---|---|
| D538,632 S | 3/2007 | Ly Hau et al. | |
| D539,126 S | 3/2007 | Stenhouse et al. | |
| D539,636 S | 4/2007 | Bremmon | |
| D539,637 S | 4/2007 | Ly Hau et al. | |
| D544,868 S | 6/2007 | Katagiri et al. | |
| D560,672 S * | 1/2008 | Muday et al. | D14/451 |
| D562,812 S | 2/2008 | Sculler et al. | |
| 7,334,766 B2 * | 2/2008 | Ligertwood | 248/292.13 |
| D563,962 S | 3/2008 | Grey | |
| D565,399 S | 4/2008 | Grey | |
| D566,444 S | 4/2008 | Grey | |
| 7,637,465 B2 * | 12/2009 | Huang | 248/222.13 |
| 2002/0033436 A1 | 3/2002 | Peng et al. | |
| 2002/0179791 A1 | 12/2002 | Kwon | |
| 2003/0141425 A1 | 7/2003 | Obdeijn | |
| 2005/0061937 A1 | 3/2005 | Kim | |
| 2005/0092890 A1 | 5/2005 | Liao | |
| 2005/0127260 A1 | 6/2005 | Dittmer | |
| 2005/0194498 A1 | 9/2005 | Burns et al. | |
| 2005/0242254 A1 | 11/2005 | Dozier | |
| 2006/0006296 A1 * | 1/2006 | Morita | 248/200 |
| 2006/0065800 A1 | 3/2006 | Bremmon | |
| 2006/0231711 A1 | 10/2006 | Shin | |
| 2006/0284037 A1 | 12/2006 | Dittmer et al. | |
| 2007/0007413 A1 * | 1/2007 | Jung et al. | 248/284.1 |
| 2007/0023593 A1 * | 2/2007 | Fedewa | 248/201 |
| 2007/0023599 A1 | 2/2007 | Fedewa | |
| 2008/0073471 A1 * | 3/2008 | Beger | 248/309.1 |

FOREIGN PATENT DOCUMENTS

| | | |
|---|---|---|
| WO | WO-2005/067681 A2 | 7/2005 |
| WO | WO-2006/044969 A1 | 4/2006 |
| WO | WO-2006/088692 A2 | 8/2006 |
| WO | WO-2006/127826 A2 | 11/2006 |
| WO | 2006133189 | 12/2006 |

OTHER PUBLICATIONS

Sanus Systems; The Union of Form and Function; International Assembly Instructions for Model VMPL250 Manual; Saint Paul, MN; 12 pgs., Oct. 2007.

Sanus Systems, The Union of Form and Function; Assembly Instructions for Model: VMPL50 Manual; St. Paul, MN; 2 pgs., Oct. 2007.

1N1-L Large/XLarge Fixed Flat Panel Mount International Instruction Manual; OmniMount Systems, Inc.; Pheonix, AZ; 20 pgs., Oct. 2007.

2N1-L Large/XlLarge Tilt Flat Panel Mount International Instruction Manual; OmniMount Systems, Inc.; Pheonix, AZ; 20 pgs., Oct. 2007.

U3 Fixed Large/XLarge Fixed Flat Panel Mount International Instruction Manual; OmniMount Systems, Inc.; Phoenix, AZ; 20 pgs., Oct. 2007.

U3 Tilt Large/XLarge Tilt Flat Panel Mount International Instruction Manual; OmniMount Systems, Inc.; Phoenix, AZ; 28 pgs., Oct. 2007.

Vantage Point Model U50 & U70 Flat Panel Mount Assembly Instructions; Vantage Point Products Corp.; Santa Fe Springs, CA; 2 pgs., Oct. 2007.

* cited by examiner

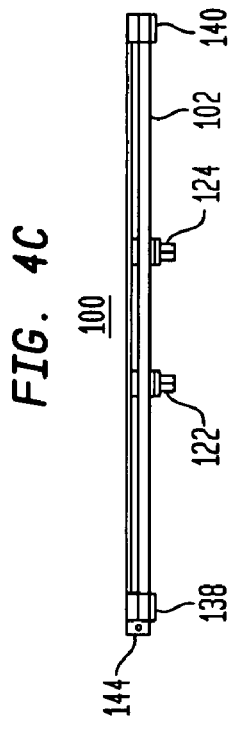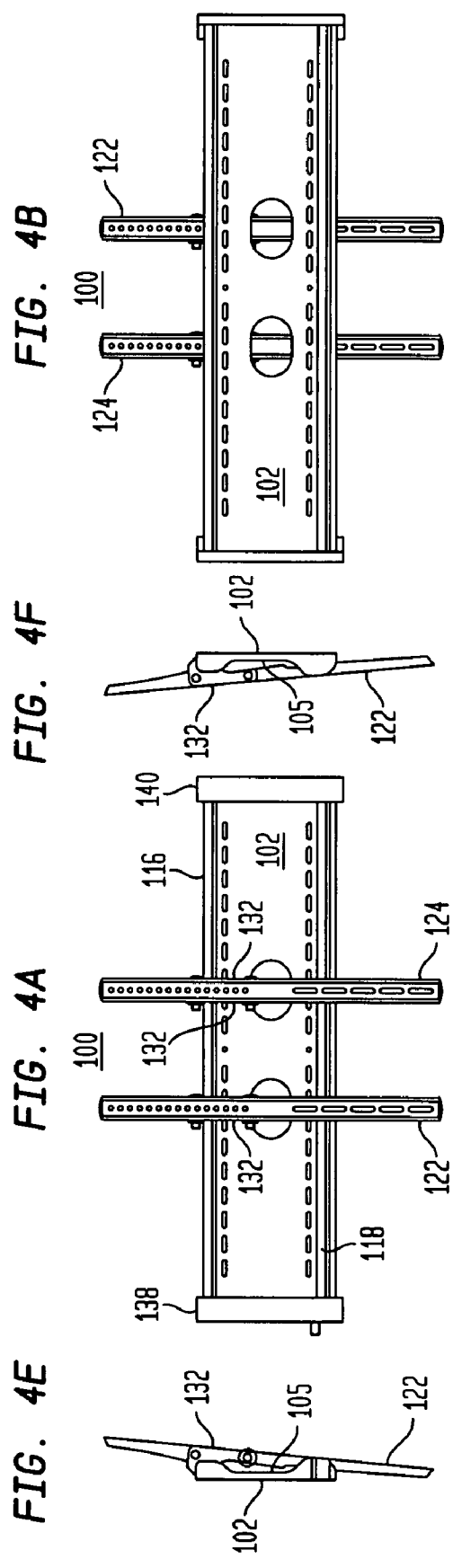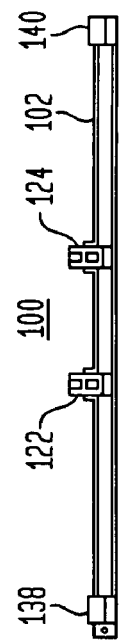

FIG. 5E    FIG. 5A    FIG. 5F    FIG. 5B
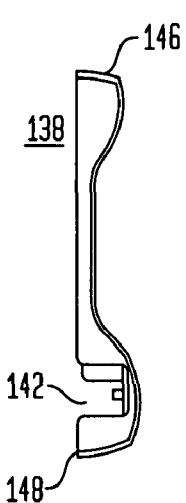 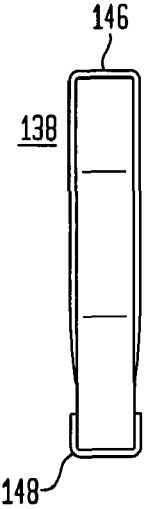 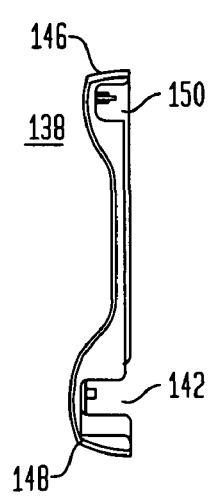 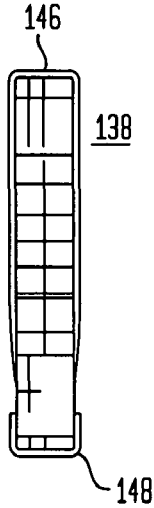

FIG. 6E    FIG. 6A    FIG. 6F    FIG. 6B
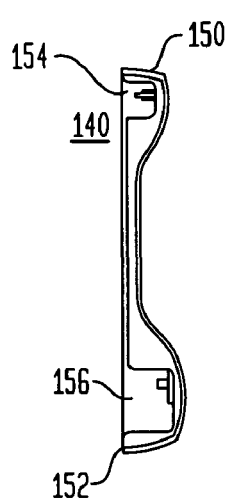 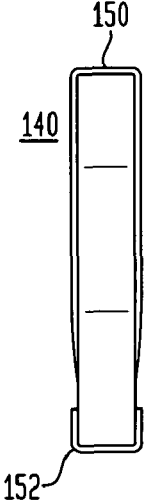 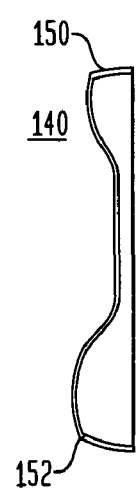 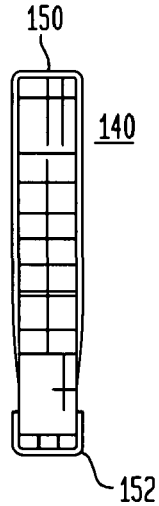

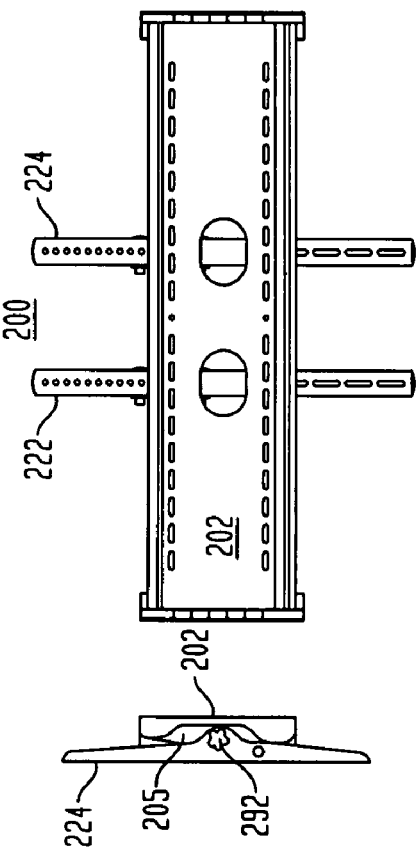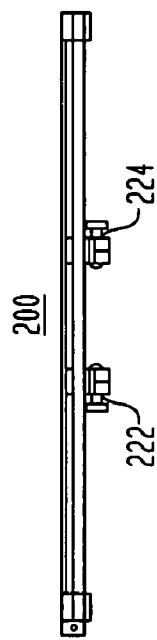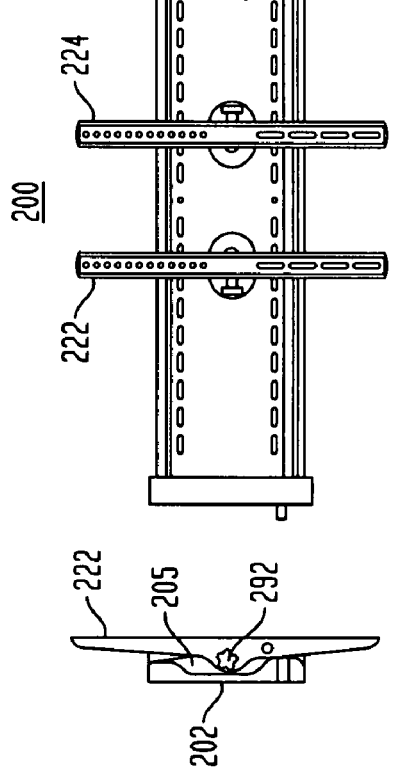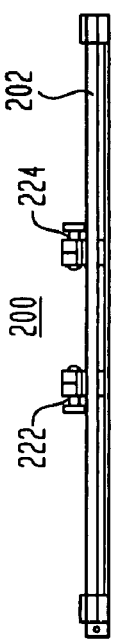

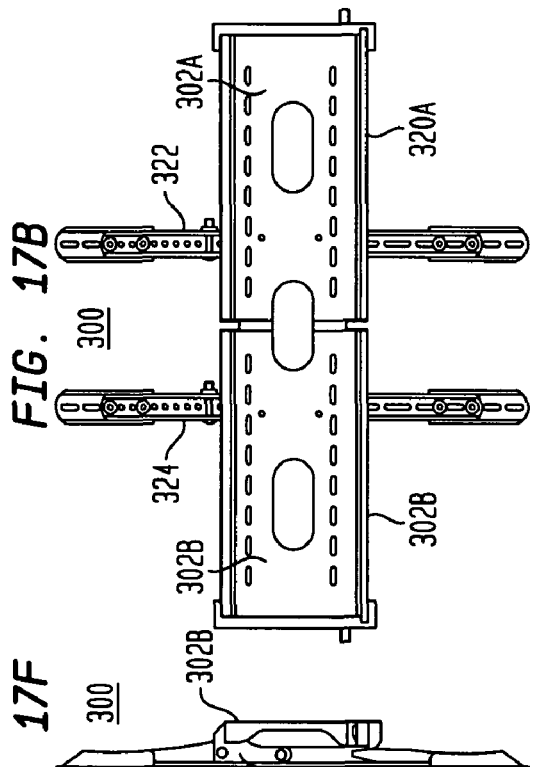
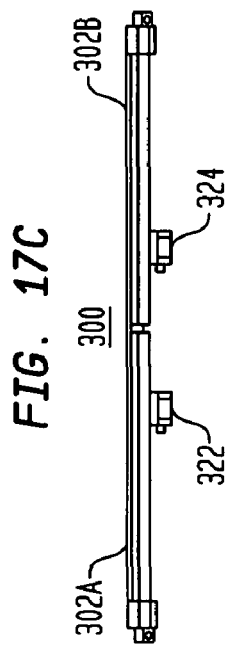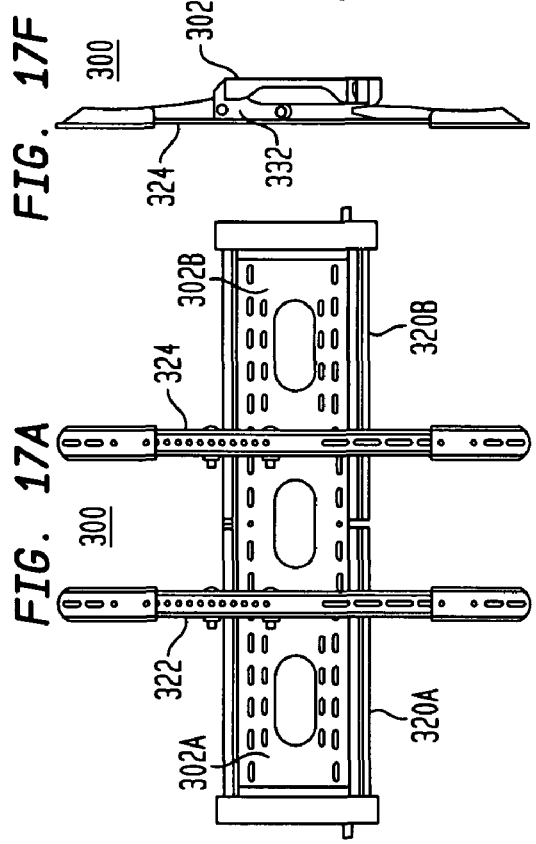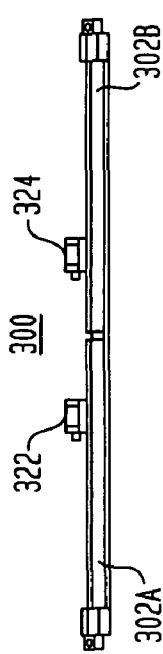
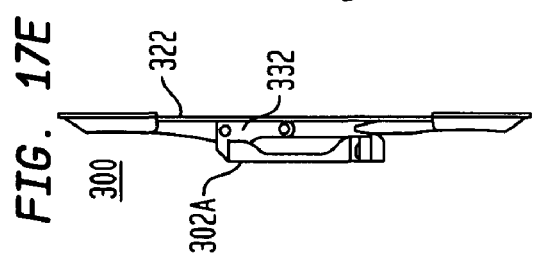

300

400

FLAT PANEL DISPLAY MOUNTING SYSTEM

BACKGROUND OF THE INVENTION

The present invention relates to television displays and more particularly relates to television mounting systems for flat panel displays.

Recently, there has been a marked growth in the popularity of flat panel displays, and in particular flat panel televisions. Flat panel televisions presently use one of two technologies, either liquid crystal or plasma display, to provide a display screen that is much thinner and lighter than traditions cathode ray televisions or projection televisions. Flat panel televisions are also versatile and that they can be placed on a stand or mounted on numerous surfaces such as a wall.

The variety and accessibility of flat panel televisions is increasing as more manufacturers enter the market and larger flat panel televisions are produced. Presently, each manufacturer of flat panel televisions offer mounting brackets, stands or other hardware that is uniquely designed to mount that particular brand of flat panel television. There are also a number of mounting systems that can be used interchangeably with different flat panel televisions, however, these mounting systems typically require a mounting plate that is specific to each unique flat panel television product.

Many of the mounting systems that are available are not versatile. These mounting systems are designed for mounting a particular flat panel television. Thus, there is a need for mounting systems that are able to mount a wide range of flat panel televisions. There is also a need for mounting systems that do not require significant manpower. As is well-known to those skilled in the art, many of the mounting systems require three or more individuals to work together to mount a flat panel televisions to a wall. Thus, there remains a need for televisions mounting systems that require less manpower for mounting a flat panel television to a wall. There is also a need for television mounting systems that more adequately protect the flat panel television mounting thereto. Finally, there remains a need for flat panel television mounting systems that enable the mounted flat panel television to be properly oriented for maximum viewing quality.

SUMMARY OF THE INVENTION

In one preferred embodiment of the present invention, a television mounting system includes a wall plate, at least one monitor arm mountable on the wall plate, and a locking element permanently connected with the wall plate. The locking element is preferably movable between an unlocked position for enabling dismounting of the at least one monitor arm from the wall plate and a locked position for preventing dismounting of the at least one monitor arm from the wall plate. In one embodiment, the locking element is pivotally attached to the wall plate for pivoting between the unlocked and locked positions. The locking element may include a locking bar positioned adjacent a lower end of the wall plate. In other preferred embodiments, the locking element may be located adjacent the upper end of the wall plate or somewhere in the middle of the wall plate between the upper and lower ends. In one embodiment, the locking element may be a tube or have a curved exterior surface.

In one preferred embodiment, a rotating element may be coupled with an end of pivotable locking element for pivoting the locking element between the locked and unlocked positions. The rotating element may have one or more grooves formed therein and be engageable by a tool (e.g. screw driver) for pivoting the locking element between the locked and unlocked positions. The one or more grooves may also be formed in the end of the locking bar.

In certain preferred embodiments, the system includes a first flange attached to the locking element, the first flange having an opening extending therethrough, and a second flange attached to the wall plate, the second flange having an opening extending therethrough, whereby the openings in the first and second flanges are aligned when the locking element is in the locked position and the openings in the first and second flanges are not aligned when the locking element is in the unlocked position. A locking element such as a lock or padlock is passable through the aligned openings in the first and second flanges when the locking element is in the locked position.

The system may also include a first fastener opening extending through the locking element, a second fastener opening coupled with the wall plate and aligned with the first fastener opening when the locking element is in the unlocked position, and a third fastener opening coupled with the wall plate, spaced from the second fastener opening and aligned with the first fastener opening when the locking element is in the locked position. The system may also have a fastener, such as a screw, insertable into the first and second fastener openings when the locking element is in the unlocked position and insertable into the first and third fastener openings when the locking element is in the locked position. The locking bar may not be rotated between the locked and unlocked positions when the fastener is inserted into the aligned fastener openings. In other preferred embodiments, a pin may be inserted into the aligned fastener openings for preventing rotation of the locking bar. The pin may be removed from the aligned openings to allow rotation of the locking bar.

The at least one monitor arm may include at least one hook engageable with the wall plate for mounting the at least one monitor arm on the wall plate. In certain embodiments, the at least one monitor arm may include a second hook engageable with the wall plate for securing the at least one monitor arm on the wall plate.

In certain preferred embodiments, the wall plate is expandable in size. The expandable wall plate may include a first wall plate section, a second wall plate section, and an expansion plate coupling the first and second wall plate sections together, whereby the first and second wall plate sections are movable away from one another for expanding the size of the wall plate and movable toward one another for reducing the size of the wall plate. The first and second wall plate sections desirably slidably engage the expansion plate when moving relative to one another. In certain preferred embodiments, the locking element comprises a first locking bar coupled with the first wall plate section and a second locking bar coupled with the second wall plate section.

In one embodiment, the at least one monitor arm may include a tilt adjustment mechanism for selectively adjusting the tilt of the at least one monitor arm relative to a front face of the wall plate. In certain embodiments, the at least one monitor arm may include fastener openings extending therethrough and the system may include fasteners insertable into the fastener openings for securing the at least one monitor arm to a television monitor. At least one extension may be attachable to the at least one monitor arm for extending the length of the at least one monitor arm.

In another preferred embodiment of the present invention, a television mounting system includes an expandable wall plate comprising a first wall plate section, a second wall plate section and an expansion plate coupling the first and second wall plate sections together. The system includes a first monitor arm mountable on the first wall plate section, and a second monitor arm mountable on the second wall plate section. The system also has a first locking element permanently connected with the first wall plate section and being movable between a locked position and an unlocked position for selectively securing the first monitor arm to the first wall plate section, and a second locking element permanently connected with the second wall plate section and being movable between a locked position and an unlocked position for selectively securing the second monitor arm to the second wall plate section.

When in the locked position, the first locking element desirably engages the first monitor arm for preventing dismounting of the first monitor arm from the first wall plate section. When the second locking element is in the locked position, the second locking element engages the second monitor arm for preventing dismounting of the second monitor arm from the second wall plate section. One or more of the monitor arms may include a tilt adjustment mechanism for selectively adjusting the tilt of the monitor arms relative to the wall plate.

In certain preferred embodiments, the first and second wall plate sections are slidably coupled with the expansion plate when moving toward and away from one another. The system may also include fasteners passable through the aligned openings in the first wall plate section and the expansion plate for preventing movement of the first wall plate section relative to the expansion plate. The system may also include fasteners passable through the aligned opening in the second wall plate section and the expansion plate for preventing movement of the second wall plate section relative to the expansion plate.

In preferred embodiments, the monitor arms comprise hooks that are engagable with the first and second wall plate sections. The first monitor arm may include first and second hooks engageable with the first wall plate section, whereby the first locking element engages the first monitor arm when in the locked position. The second monitor arm may include first and second hooks engageable with the second wall plate section, whereby the second locking element engages the second monitor arm when in the locked position. In certain preferred embodiments, the first locking element is pivotally connected with the first wall plate section for pivoting between the locked position and the unlocked position, and the second locking element is pivotally connected with the second wall plate section for pivoting between the locked position and the unlocked position.

In another preferred embodiment of the present invention, a television mounting system includes a wall plate having an upper end and a lower end, a locking bar pivotally mounted to the wall plate, the locking bar being movable between a locked position and an unlocked position, and at least one monitor arm mountable on the wall plate, whereby in the locked position the locking bar prevents dismounting of the at least one monitor arm from the wall plate. The at least one monitor arm desirably includes a tilt adjustment mechanism for selectively adjusting the tilt of the at least one monitor arm relative to the wall plate. The wall plate may include a first wall plate section, a second wall plate section and an expansion plate that couples the first and second wall plate sections together, whereby the first and second wall plate sections are movable away from one another for expanding the size of the wall plate.

In certain preferred embodiments, the at least one monitor arm includes a first monitor arm mountable on the first wall plate section and a second monitor arm mountable on the second wall plate section. The system may also include a first locking bar pivotally mounted to the first wall plate section and a second locking bar pivotally mounted to the second wall plate section.

In one or more preferred embodiments, the at least one monitor arm includes a first hook, a second hook spaced from the first hook and a C-shaped opening underlying the second hook, whereby the locking bar engages the C-shaped opening underlying the second hook when the locking bar is in the locked position for preventing dismounting of the at least one monitor arm from the wall plate.

The wall plate may include a top ledge adjacent an upper end of the wall plate and a bottom ledge adjacent a lower end of the wall plate, whereby the first hook is engageable with the top ledge and the second hook is engageable with the bottom ledge.

These and other preferred embodiments of the present invention will be described in more detail below.

BRIEF DESCRIPTION OF THE DRAWINGS

FIGS. 4A-4F show further views of the television mounting systems shown in FIGS. 2A-2B.

FIGS. 5A-5F show a left end cap coupled with the television mounting system shown in FIGS. 2A-2B.

FIGS. 6A-6F show a right end cap for the television mounting system of FIGS. 2A-2B.

FIGS. 12A-12F show further views of the television mounting system shown in FIGS. 11A-11B.

FIGS. 17A-17F show further views of the television mounting system shown in FIG. 16A-16B.

DETAILED DESCRIPTION OF PREFERRED EMBODIMENTS

Figure 1A:
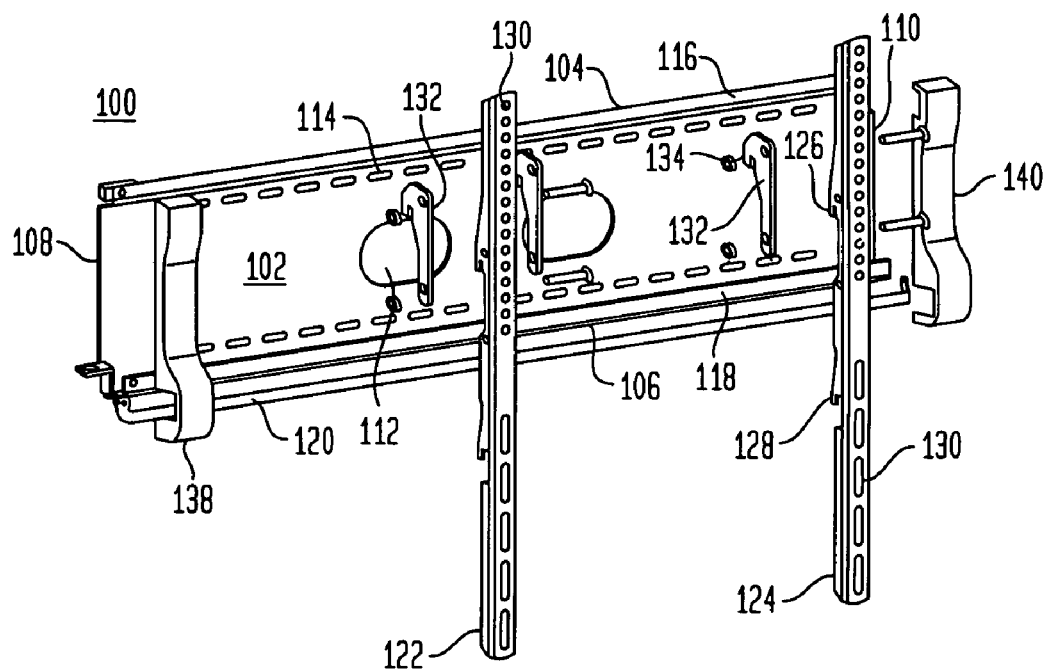
FIGS. 1A and 1B show an exploded view of a television mounting system, in accordance with certain preferred embodiments of the present invention.
Figure 1B:
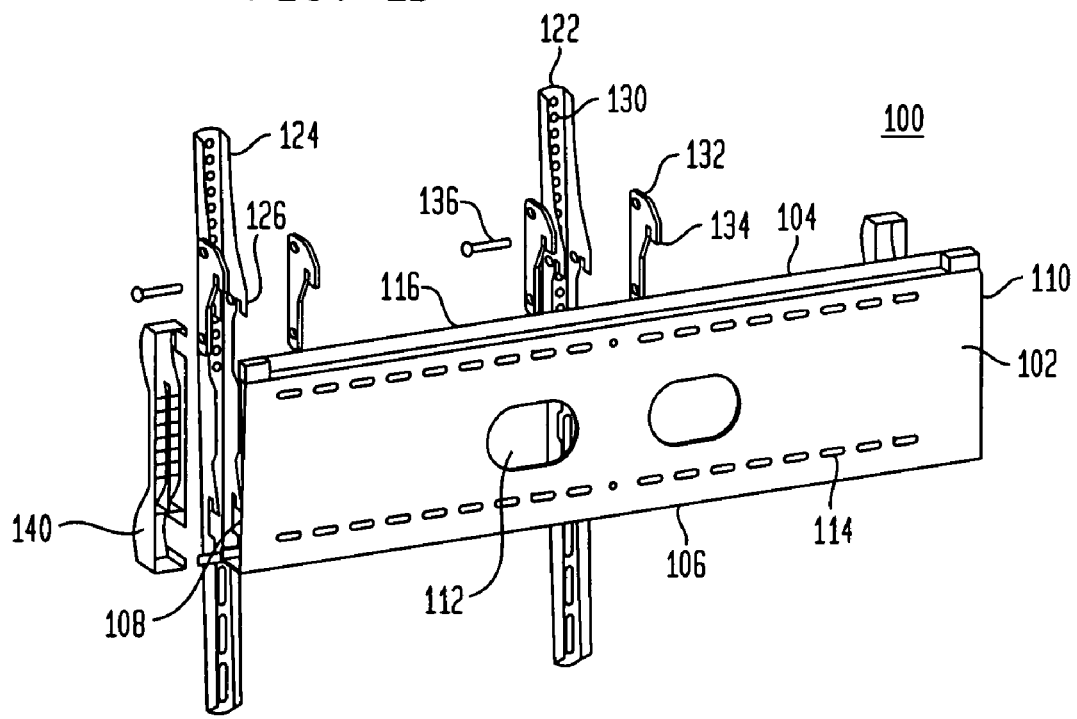

Referring to FIGS. 1A and 1B, in certain preferred embodiments of the present invention, a television mounting system 100 includes a wall plate 102 having an upper end 104, a lower end 106, a first side 108 and a second side 110. The wall plate 102 is preferably made of a sturdy material such as metal. The wall plate has one or more central openings 112 extending from a first face to the second face thereof. The openings 112 are preferably used for passing wires or cables through the wall plate 102, such as audio, video or power cables. The cables passed through the central openings 112 are preferably connected with a television monitor for supplying power, audio or video to the television monitor. The wall plate also includes a plurality of mounting openings 114 used for securing the wall plate 102 to a wall.

Wall plate 102 includes a top ledge 116 that extends along the upper end 104 of the wall plate. The top ledge 116 preferably extends between the first and second sides 108, 110 of the wall plate. Referring to FIG. 1A, wall plate 102 also includes a bottom ledge 118 that also preferably extends between the first and second sides 108, 110 of the wall plate.

Referring to FIG. 1A, the television mounting system 100 also desirably includes a locking bar 120 that is connected to the wall plate 102. As will be described in more detail below, the locking bar may be pivoted between a first unlocked position and a second locked position. In the locked position, the locking bar prevents removal of a television monitor from its connection to the television mounting system, as will be described in more detail below.

Referring to FIGS. 1A and 1B, the television mounting system also includes arms 122 and 124. The monitor arms are adapted to be secured to a television monitor. Although only two monitor arms are shown in FIGS. 1A and 1B, in other preferred embodiments, the television mounting system may use less than two or more than two monitor arms. Each monitor arm 122, 124 preferably includes a top hook 126 for engaging the top ledge 116 and a bottom hook 128 for engaging the bottom ledge 118. Each monitor arm 122, 124 also includes openings 130 that are preferably used for securing the monitor arms to a television monitor. In certain preferred embodiments, fasteners such as screws are passed through the openings 130 of the monitor arms 122, 124 for securing the monitor arms to the television monitor.

The television mounting system 100 also preferably includes tilt adapters 132 that may be attached to the respective monitor arms 122, 124. Each tilt adapter 132 has a hook 134 that is adapted to engage the top ledge 116. The tilt adapters 132 are secured to the monitor arms 122, 124 using fasteners 136 such as threaded fasteners and nuts. When the tilt adapters 132 have been secured to the monitor arms, the hooks 134 on the tilt adapters engage the top ledges 116 rather than the upper hooks 126 provided on the monitor arms. As a result, the monitor arms are titled relative to the front face of the wall plate 102, which in turn results in tilting of the television monitor that is secured to the monitor arms. In preferred embodiments, the tilt adapters tilt the monitor arms between 1-15°.

The television mounting system 100 also includes a left end cap 138 and a right end cap 140. The left and right end caps 138, 140 are preferably fit over the first and second sides of 108, 110 of the wall plate 102. As will be described in more detail below, the left and right end caps 138, 140 include wells that at least partially cover the ends of the locking bar 120.

Figure 2A:
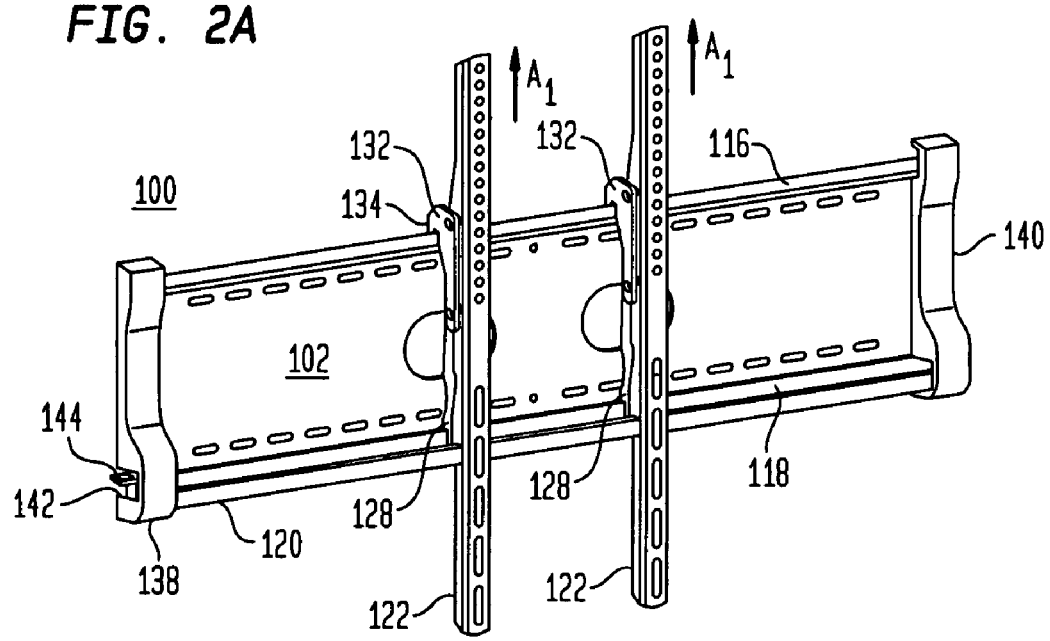
FIGS. 2A and 2B show the television mounting system of FIGS. 1A and 1B in an assembled configuration.
Figure 2B:
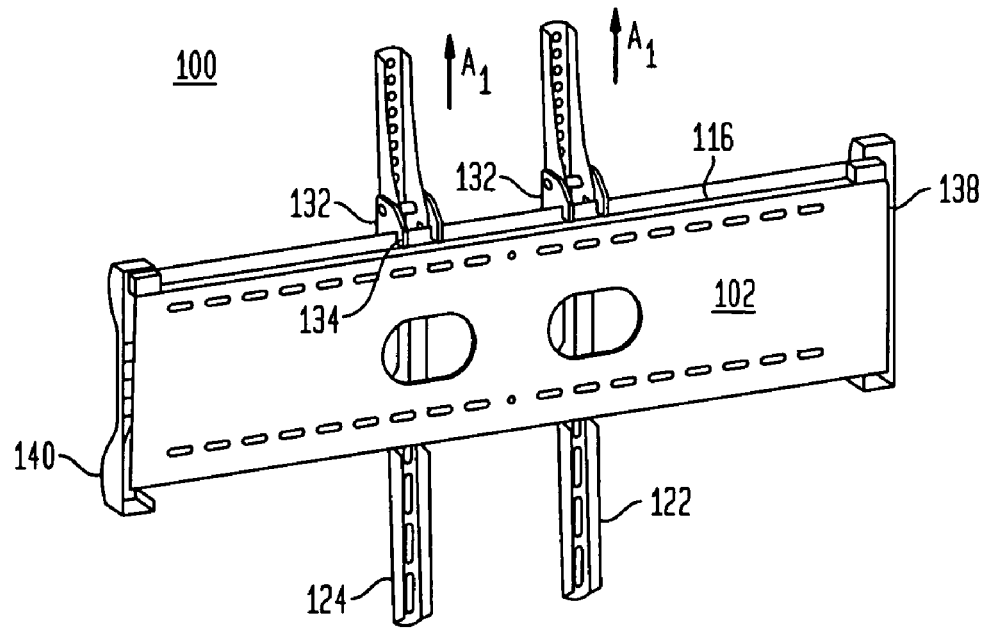

FIGS. 2A and 2B show the television mounting system of FIGS. 1A and 1B in an assembled configuration. In the embodiment shown of FIGS. 2A and 2B, the tilt adapters 132 are secured to the monitor arms 122, 124 so that the hooks 134 on the tilt adapters 132 engage the top ledge 116 of wall plate 102. Moreover, the bottom hooks 128 on the monitor arms engage the bottom ledge 118 of the wall plate 102. The use of the tilt adapters 132 tilts the monitor arms 122, 124 relative to the front face of the wall plate 102. As a result, the television monitor (not shown) attached to the monitor arms 122, 124 is tilted as well.

In FIG. 2A, the locking bar 120 is in the locked position. As will be described in more detail below, the locking bar prevents the monitor arms 122, 124 from being lifted off the wall plate 102. This is because the locking bar 120 when in the locked position, fits within the C-shaped opening beneath the bottom hooks 128 of the monitor arms 122, 124. The C-shaped opening includes a ledge that abuts against the locking bar 120 when the monitor arms 122, 124 are moved in the direction indicated by arrow $A_1$. In other words, when the locking bar 120 is in the locked configuration, the locking bar prevents the monitor arms 122, 124 from being lifted off from their engagement with the top and bottom ledges 116, 118 of the wall plate 102. The monitor arms 122, 124 can only be removed from their engagement with the top and bottom ledges 116, 118 of the wall plate if the locking bar 120 is moved into the unlocked configuration.

As noted above, left and right end caps 138, 140 may be secured over the ends of the wall plate 102. As shown in FIG. 2A, left end cap 138 includes an opening through which a padlock support 144 may pass. The padlock support 144 includes an end of the locking bar 120 and a flange having an opening secured to the first end of the wall plate. The padlock support 144 enables a padlock or other similar type of locking device to be placed through openings extending therethrough for securing the locking bar 120 in a locked position. Securing the locking bar in the locked position prevents the unauthorized unlocking of the locking bar 120, which could result from an attempt to steal a television monitor mounted on the television mounting system 100. In certain preferred embodiments, a first padlock support may be provided at a first end of the locking bar and a second padlock support may be provided at an opposite end of the locking bar. As a result, a first padlock may be secured to the first end of the locking bar and a second padlock may be secured to the second end of the locking bar.

Figure 3:
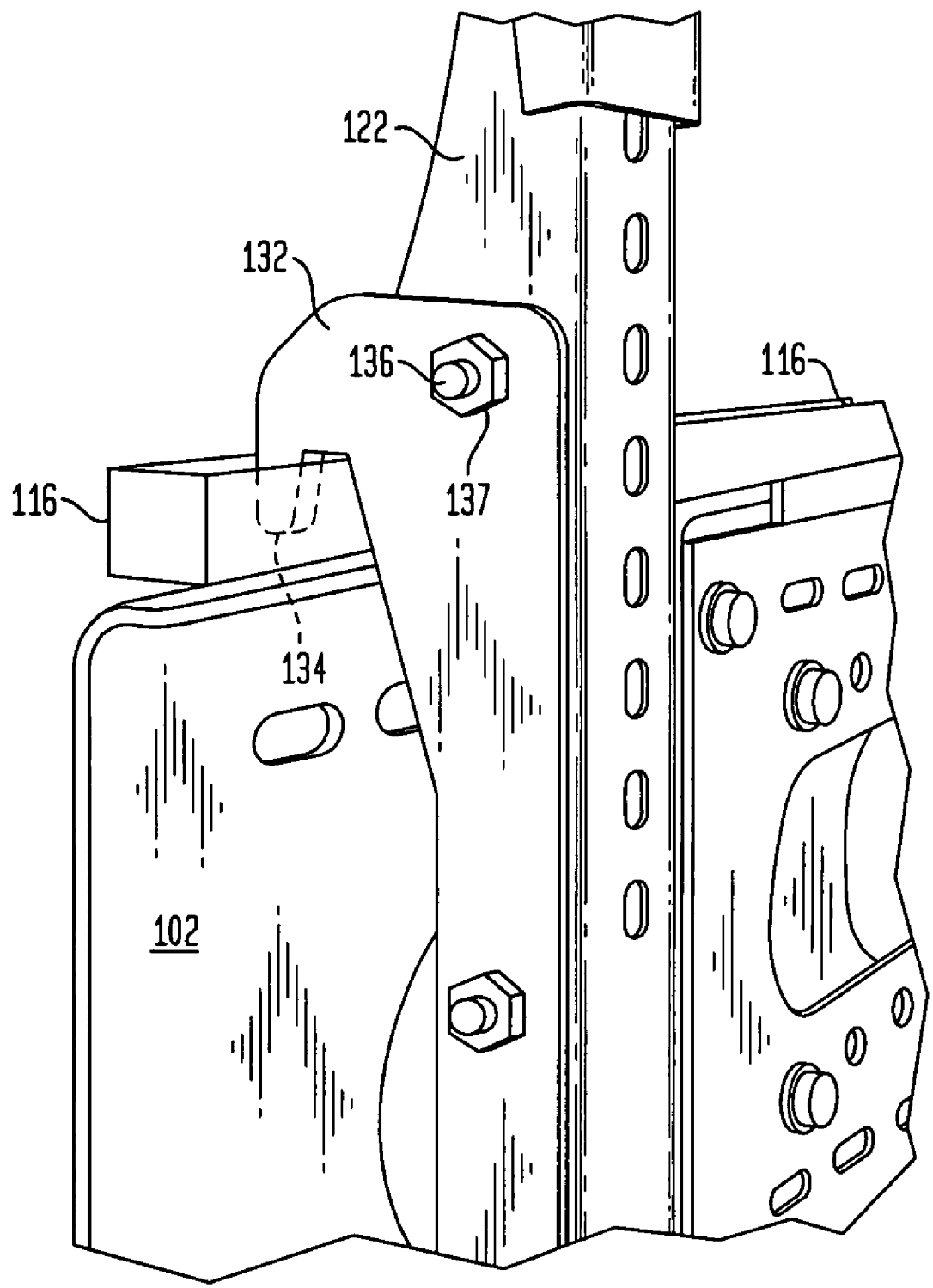
FIG. 3 shows the television mounting system of FIG. 2A including a tilt adapter secured to a monitor arm.

FIG. 3 shows the tilt adapter 132 secured to a monitor arm 122 using one or more threaded fasteners 136 and one or more locking nuts 137. After the tilt adapter 132 is secured to the monitor arm 122, the monitor arm 122 may be secured to the wall plate 102 by engaging the hook 134 of the tilt adapter 132 with the top ledge 116 of the wall plate 102. The tilt adapter 132 tilts the monitor arm 122 forward, which in turns provides a tilt to the television monitor (not shown) secured to the monitor arm. In certain preferred embodiments, the tilt adapter 132 tilts the monitor arm 122 by about 5 degrees. Although the present invention is not limited by any particular theory of operation, it is believed that the tilt adapter 132 provides the tilting action because the hook 134 on the tilt adapter 132 is used rather than the top hook provided on the monitor arm 122.

FIGS. 4A-4D show the television mounting system 100, in accordance with certain preferred embodiments of the present invention. The television mounting system 100 includes wall plate 102 having monitor arms 122, 124 secured thereto. Referring to FIG. 4A, each of the monitor arms 122, 124 has two tilt adapters 132 secured thereto. The hooks on the tilt adapters 132 engage the top ledge 116 of the wall plate. The bottom hooks 128 (FIG. 1A) on the respective monitor arms 122, 124 engage the bottom ledge 118 on the wall plate 102.

FIGS. 4E and 4F show the tilt adapters 132 engaging the top ledge of the wall plate 102. The tilt adapters 132 tilt the monitor arm 122 forward relative to the front face 105 of the wall plate 102. As a result, the television monitor (not shown) attached to the monitor arms 122, 124 is tilted forward. If tilting of the monitor arms is not desired, the tilt adapters 132 may be removed from the monitor arms and the original top hooks of the monitor arms utilized.

Referring to FIGS. 4C and 4D, the left and right end caps 138, 140 are secured over the ends of the wall plate 102. The padlock support 144 projects through an opening in the left end cap 138.

Figure 5C:
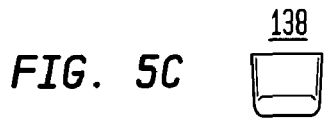
Figure 5D:

FIGS. 5A-5F show the left end cap 138, which includes an upper end 146 and a lower end 148. Referring to FIGS. 5E and 5F, the upper end 146 of the left end cap 138 has an opening 150 on its inner face and a closed surface on its outer face. As noted above, the lower end 148 of the left end cap 138 includes an opening 142 that extends from the inner face to the outer face thereof. The opening 142 at the lower end enables the padlock support 144 shown in FIG. 2A to extend therethrough.

Figure 6C:
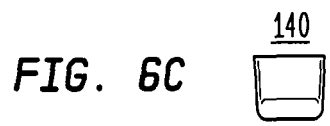
Figure 6D:

Referring to FIG. 6A-6F, the television mounting system also includes the right end cap 140, which includes an upper end 150 and a lower end 152. Referring to FIG. 6E, the right end cap 140 includes an opening 154 on its inner face that is located adjacent the upper end 150 thereof. The outer face of the right end cap 140 is closed at the upper end. The lower end 152 of the right end cap 140 includes a second opening 156 provided at the inner face. The lower end of the right end cap 140 is closed at its outer face.

Figure 7:
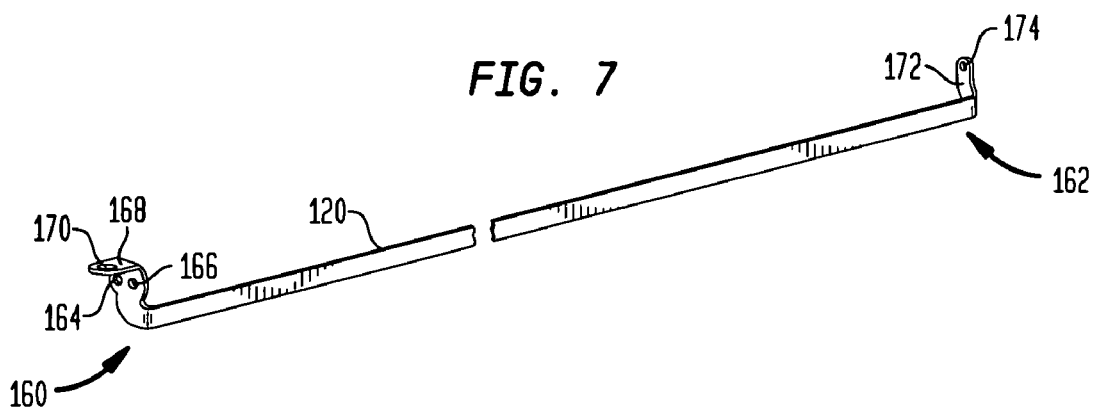
FIG. 7 shows a locking bar for the television mounting systems of FIGS. 2A-2B.

Referring to FIG. 7, the television mounting system includes the locking bar 120 having a first end 160 and a second end 162. The first end 160 includes a first opening 164 and a second opening 166. The first opening 164 is adapted to receive a fastener such as a screw for locking the locking bar in an unlocked position or a locked position. The second opening 166 is adapted to receive a rotating screw that may be engaged for rotating the locking bar 120 between the unlocked and locked positions. The first end 160 of the locking bar 120 also includes a flange 168 having an opening 170 extending therethrough. The flange 168 and the opening 170 comprise a portion of the padlock support 144 shown and described above in FIG. 2A. The second end 162 of the locking bar 120 includes a flange 172 having an opening 174 extending therethrough. The opening 174 is preferably secured to a shaft that enables the second end 162 of the locking bar 120 to pivot between the unlocked position and the locked position.

Figure 8A:
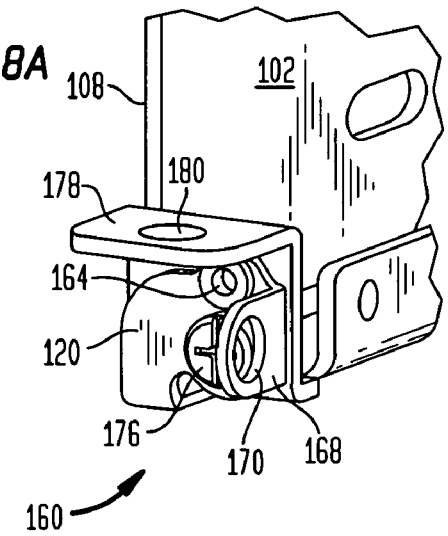
FIG. 8A shows the locking bar of FIG. 7 in an unlocked position.

FIG. 8A shows the locking bar 120 in the unlocked position. As described above, the first end 160 of the locking bar 120 includes a first opening 164 that receives a fastener (not shown) for holding the locking bar 120 in the unlocked position. The first end 160 of the locking bar 120 also includes the second opening (not shown) and a rotating element 176 extending through the second opening. Before the locking bar 120 may be pivoted between the unlocked and locked positions, the fasteners extending through the first opening 164 must be removed. Once the fastener extending through the first opening 164 has been removed, a tool such as a screwdriver may engage the groove(s) provided in the head of the rotating element 176 for rotating the locking bar between the unlocked position shown in FIG. 8A and the locked position shown in FIG. 8B. In other embodiments, one or more grooves may be formed in the end of the locking bar. The one or more grooves may be engaged by a tool such as a screwdriver for rotating the locking bar.

Figure 8B:
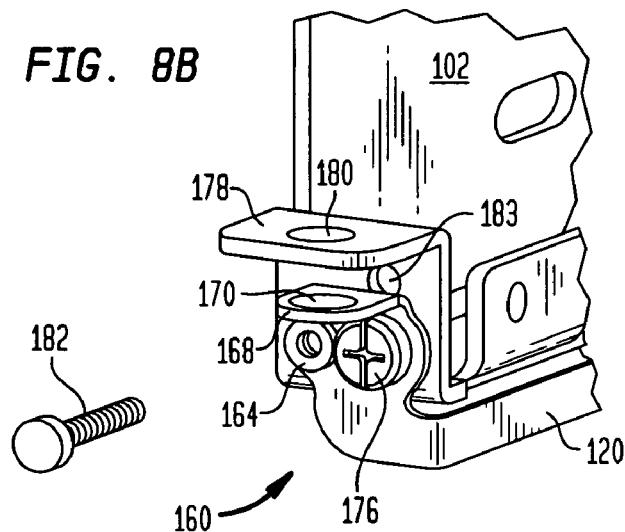
FIG. 8B shows the locking bar of FIG. 7 in a locked position.

FIG. 8B also shows the flange 168 having an opening 170 that is provided at the first end 160 of the locking bar 120. The flange 168 and the opening 170 cooperate with a second flange 178 having an opening 180 that is provided at the first end 108 of the wall plate 102. In certain preferred embodiments, the second end 162 of the locking bar has the same locking structure as is provided at the first end of the locking bar. Thus, locking elements such as padlocks may be used at both ends of the locking bar. In one or more preferred embodiments, the locking bar may be a tube-like structure having a rounded exterior surface.

Figure 8C:
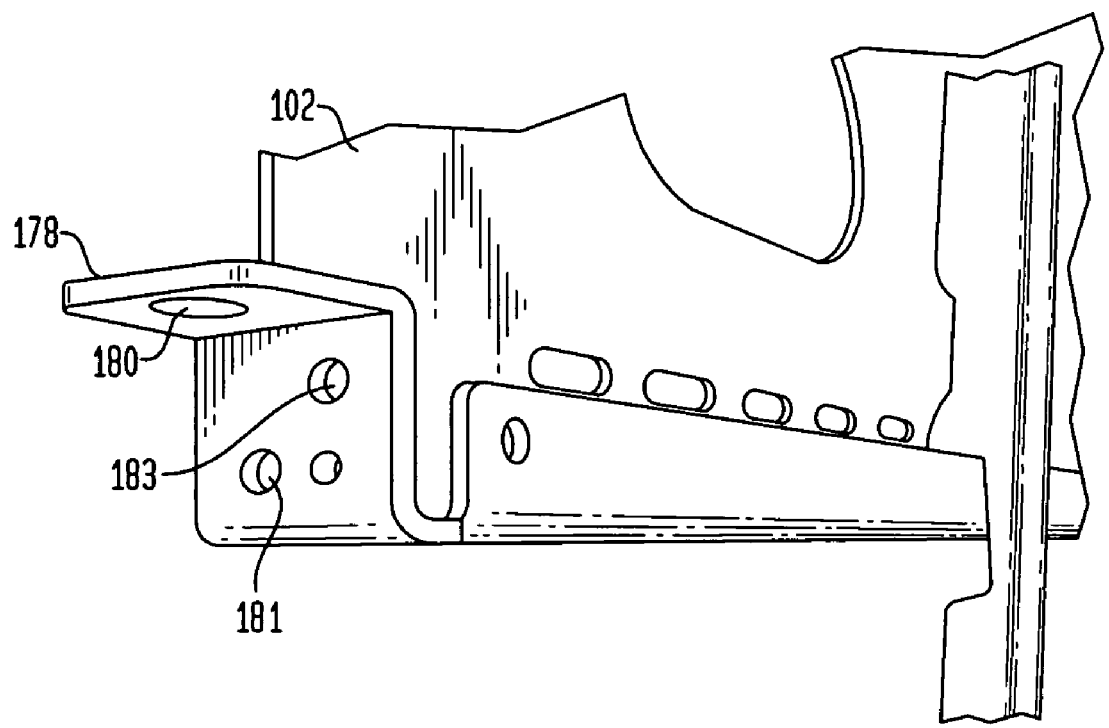
FIG. 8C shows a flange secured to an end of a wall plate that supports movement of the locking bar of FIG. 7 between unlocked and locked positions.

Referring to FIG. 8C, the second flange 178 is preferably connected with the first end of the wall plate 102. The second flange 178 preferably includes a first fastener opening 181 and a second fastener opening 183 that are adapted to receive the fastener 182 shown in FIG. 8B. When the locking bar 120 is in the locked position shown in FIG. 8B, the first opening 164 at the first end 160 of the locking bar 120 is aligned with the first fastener opening 181 in the second flange 178. The fastener 182 may be inserted (e.g. threaded) into the aligned openings 164, 181 for securing the locking bar in the locked position. A locking element such as a padlock may also be passed through the aligned openings 170, 180 to secure the locking bar 120 in the locked position.

When the locking bar 120 is in the unlocked position shown in FIG. 8A, the first opening 164 at the first end 160 of the locking bar 120 is aligned with the second fastener opening 183 in the second flange 178. The fastener 182 (FIG. 8B) may be inserted into the aligned openings 164, 183 for securing the locking bar in the unlocked position.

Referring to FIG. 8B, after fastener 182 has been removed from the first opening 164 at the first end 160 of locking bar 120, a tool may engage the head of rotatable screw 176 for pivoting the locking bar 120 from the position shown in FIG. 8A to the position shown in FIG. 8B. After the locking bar 120 has been rotated into the locked position shown in FIG. 8B, the fastener 182 may be reinserted into the first opening 164 for locking the locking bar 120 in the locked position. In the locked position shown in FIG. 8B, the opening 170 of the locking bar flange 168 is aligned with the opening 180 of the flange 178 secured to the wall plate 102. A securing element such as a padlock may be passed through the aligned openings 170, 180 for further securing the locking bar 120 in the locked position.

Figure 9A:
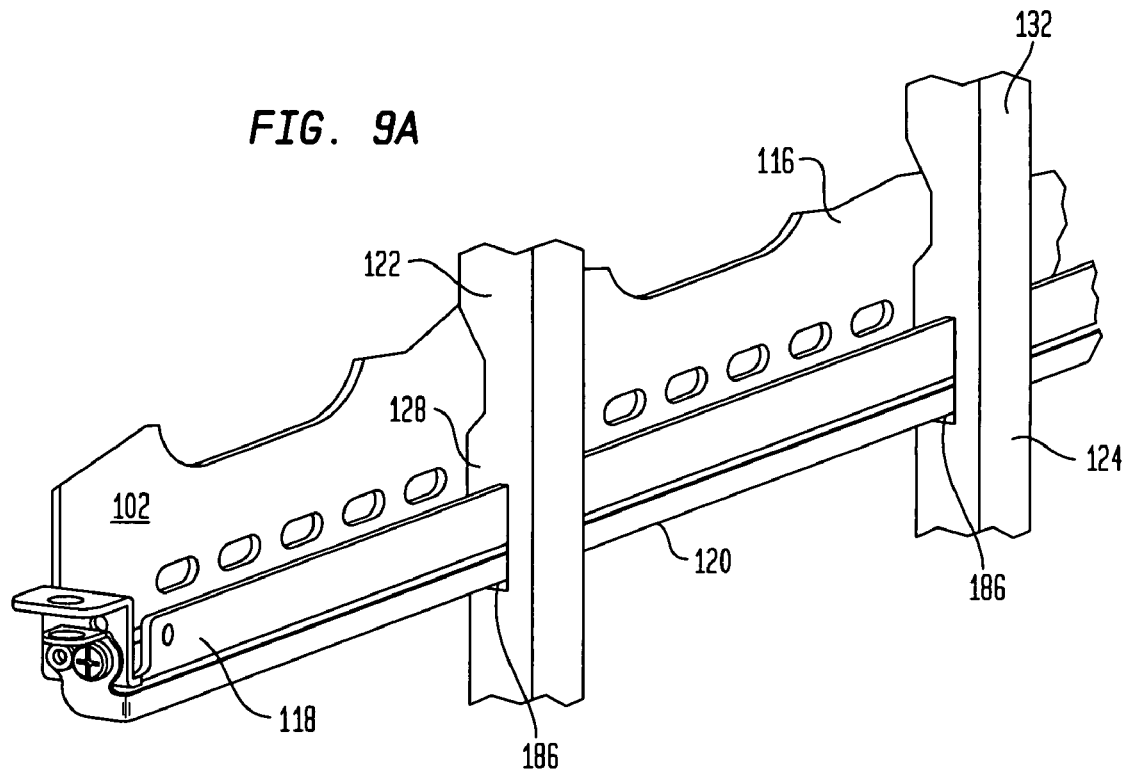
FIG. 9A shows another view of the television mounting system of FIGS. 2A and 2B with the locking bar in the locked position.

FIG. 9A shows the front face of wall plate 102. Wall plate 102 includes a top ledge 116 extending along an upper end thereof and a bottom ledge 118 extending along a lower end thereof. Monitor arms 122, 124 are secured to the respective top and bottom ledges 116, 118. As shown in FIG. 9A, the hook on tilt adapter 132 engages top ledge 116 of wall plate 102 and the bottom hooks 128 on the monitor arms engage the bottom ledge 118.

As shown in FIG. 9A, each monitor arm 122, 124 includes a C-shaped opening 186 provided below the bottom hooks 128. In the locked position shown on FIG. 9A, the locking bar 120 sits within the C-shaped opening 186, thereby preventing monitor arms 122, 124 from being lifted from their engagement with the top and bottom ledges 116, 118 of the wall plate 102.

Figure 9B:
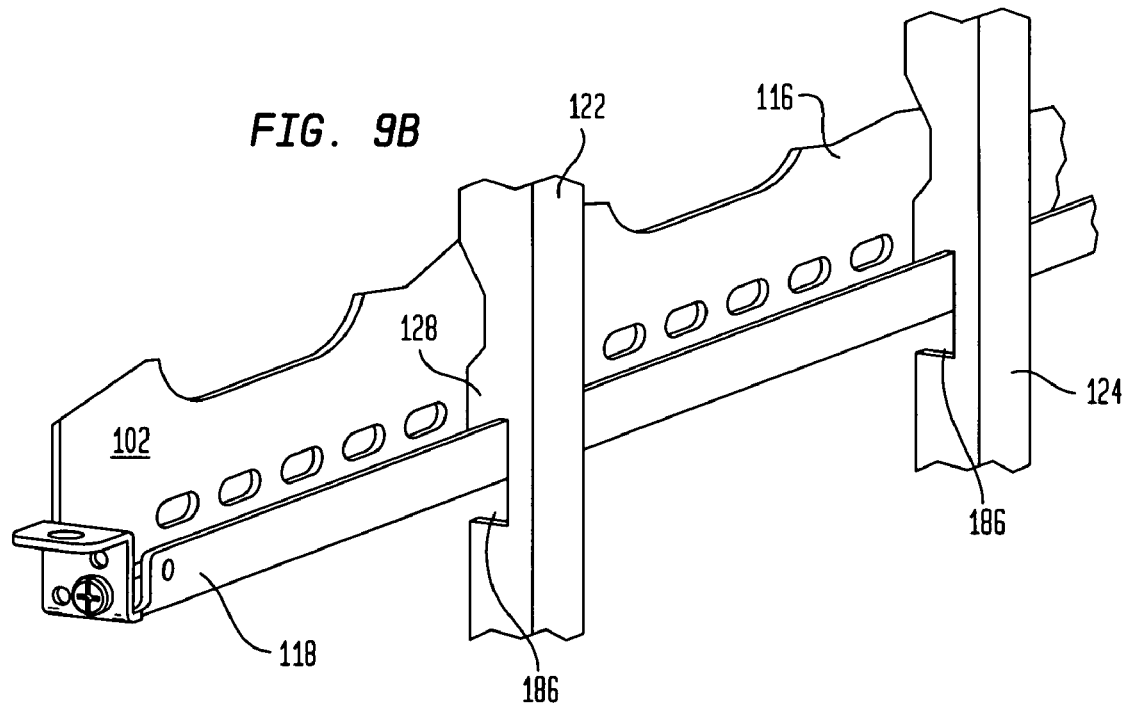
FIG. 9B shows the television mounting system of FIGS. 2A and 2B with the locking bar removed.

FIG. 9B shows the locking bar removed from its pivotal attachment to the wall plate 102. The locking bar has been removed from FIG. 9B to better show the C-shaped openings 186 that are provided below the bottom hooks 128 on the monitor arms 122, 124. As shown in FIG. 9B, there is a substantial space that is occupied by the locking bar when the locking bar is in the locked position. As shown in FIG. 9A, rotating the locking bar into the C-shaped openings 186 results in most of the open space being filled by the locking bar. As a result, the monitor arms may not be lifted sufficiently to remove the hooks on the monitor arms from the respective top and bottom ledge 116, 118 on the wall plate 102. The monitor arms may only be removed from the wall plate when the locking bar has been moved to the unlocked position.

Figure 10A:
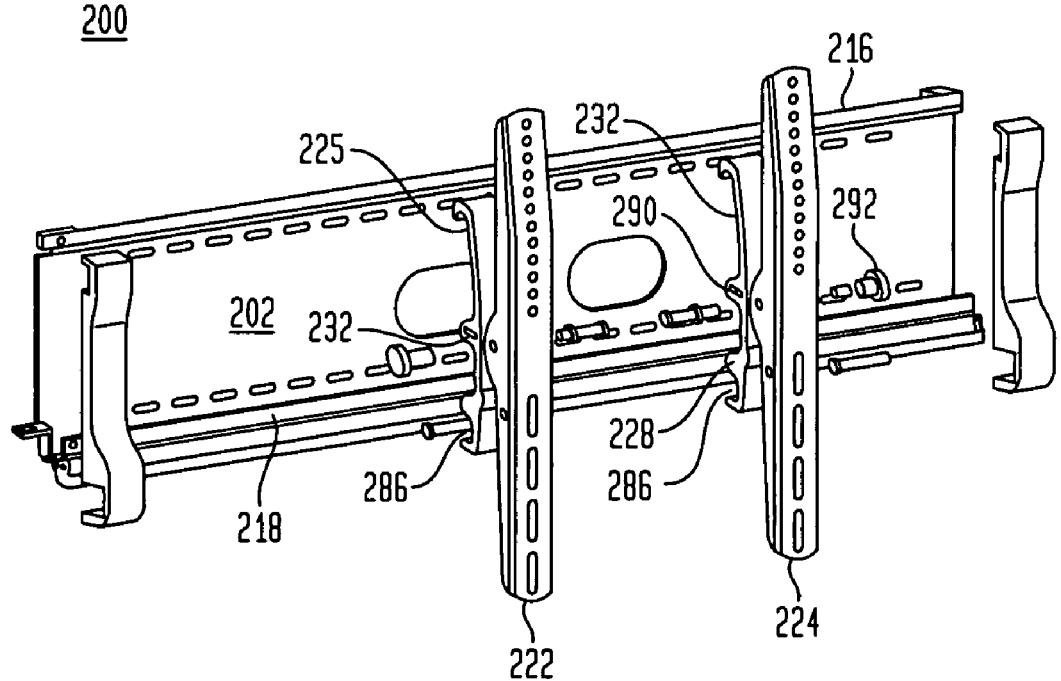
FIGS. 10A and 10B show an exploded view of a television mounting system including tiltable monitor arm, in accordance with certain preferred embodiments of the present invention.
Figure 10B:
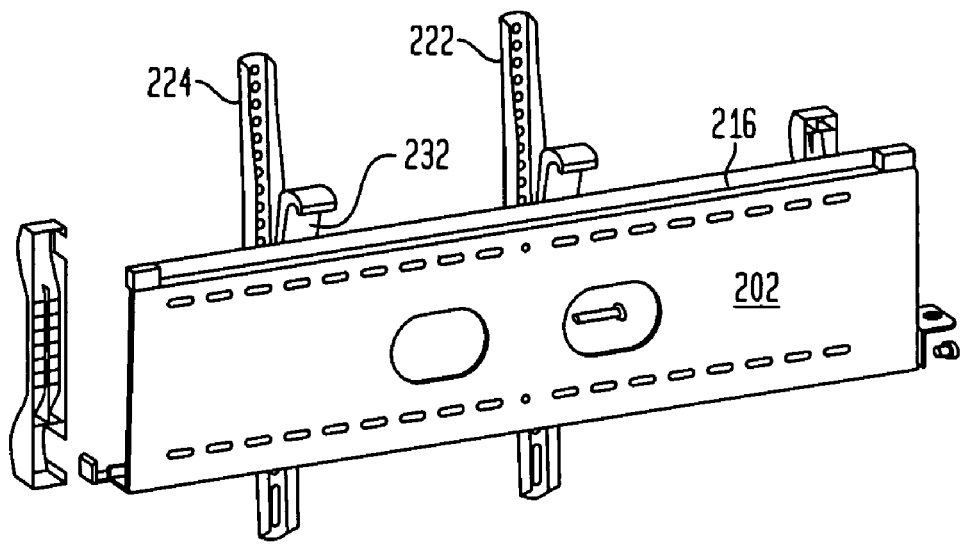

FIGS. 10A and 10B show a television mounting system having tiltable monitor arms, in accordance with certain preferred embodiments of the present invention. The television mounting system 200 shown in FIGS. 10A and 10B has many of the features shown and described above with respect to earlier embodiments disclosed in the present application. Referring to FIGS. 10A and 10B, wall plate 202 has a top ledge 216 and a bottom ledge 218. The television mounting system 200 includes monitor arms 222, 224, each having a tilt adapter 232 secured thereto. The tilt adapter 232 shown in FIGS. 10A and 10B is different from the tilt adapter described above because the tilt adapter of FIGS. 10A-10B may be utilized to place the monitor arms 222, 224 at a plurality of different angles relative to the wall plate. In contrast, the tilt adapter described above was a fixed tilt adapter that did not allow the tilt of the monitor arms to be changed.

Referring to FIG. 10A, the tilt adapter 232 includes a top hook 225 and a bottom hook 228. The tilt adapter also includes an elongated slot 290 through which a tighten mechanism 292 may pass. The tilt adapter 232 also includes a C-shaped opening 286 located below the bottom hook 228.

Figure 11A:
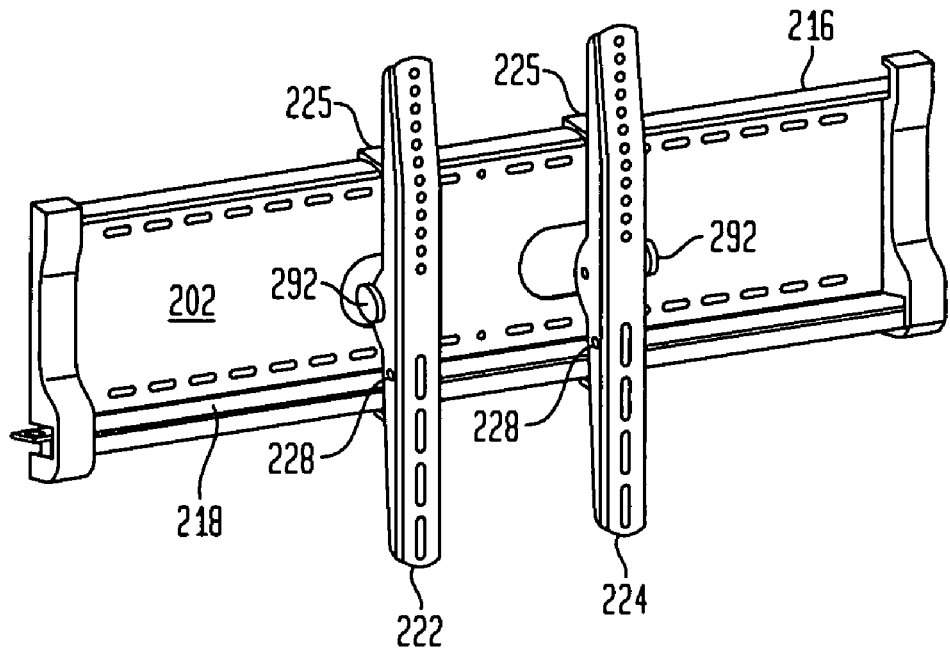
FIGS. 11A and 11B show the television mounting system of FIGS. 10A and 10B in an assembled configuration.
Figure 11B:
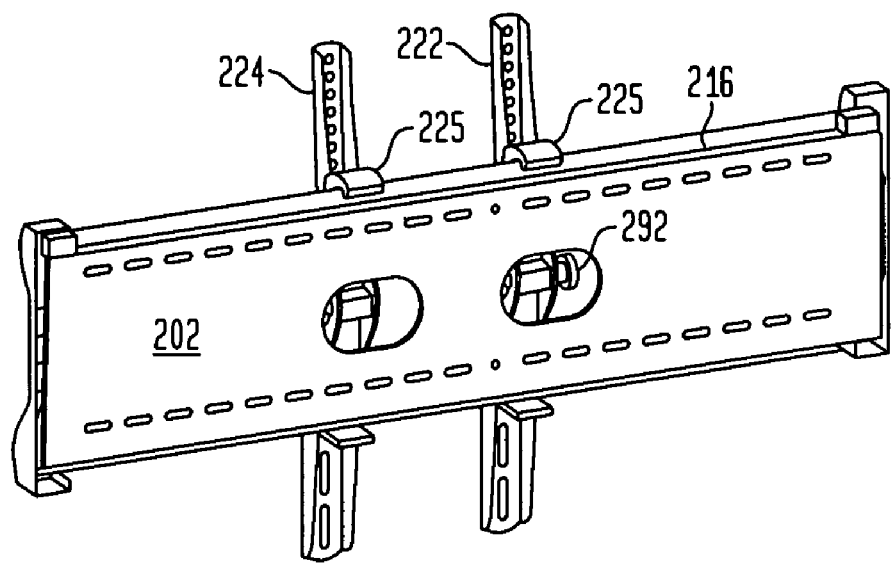

Referring to FIGS. 11A and 11B, the monitor arms 222, 224 are secured to the wall plate 202 by hooking top hooks 225 of the tilt adapter over the top ledge 216 of the wall plate. Similarly, bottom hooks 228 of the tilt adapter are hooked over bottom ledge 218 of the wall plate 202. In order to change the angle of tilt of the monitor arms 222, 224 relative to the wall plate 202, the tightening mechanism 292 of the tilt adapter may be loosened. When the tightening mechanism has been loosened, the tilt adapter enables the monitor arms 222, 224 to be tilted to a desired angle relative to the front face of the wall plate 202.

Referring to FIGS. 12A-12D, television mounting system 200 includes wall plate 202 having tiltable monitor arms 222, 224 secured thereto. Referring to FIGS. 12E and 12F, each of the monitor arms 222, 224 has a tightening mechanism 292 coupled with a tilt adapter that enables the monitor arms 222, 224 to be tilted relative to a front face 205 of wall plate 202.

Figure 13:
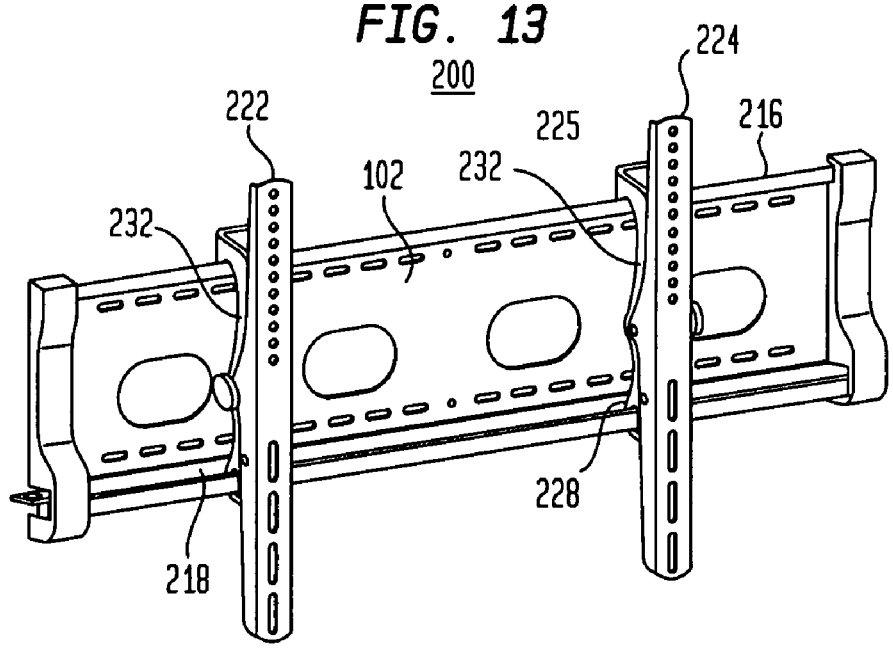
FIG. 13 shows another view of the television mounting system shown in FIG. 11A.
Figure 14A:
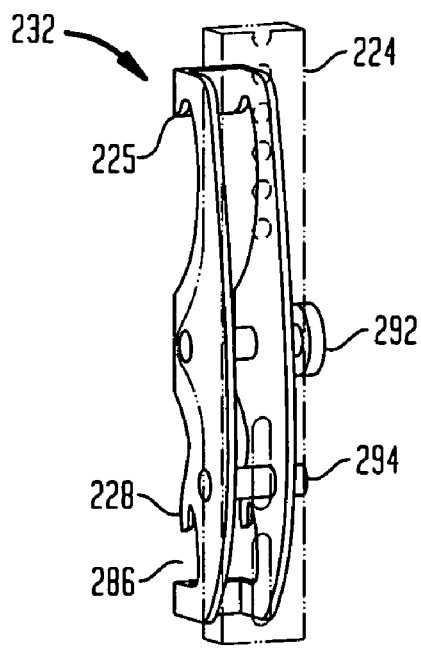
FIGS. 14A and 14B show a tilt adapter coupled with a monitor arm, in accordance with certain preferred embodiments of the present invention.
Figure 14B:
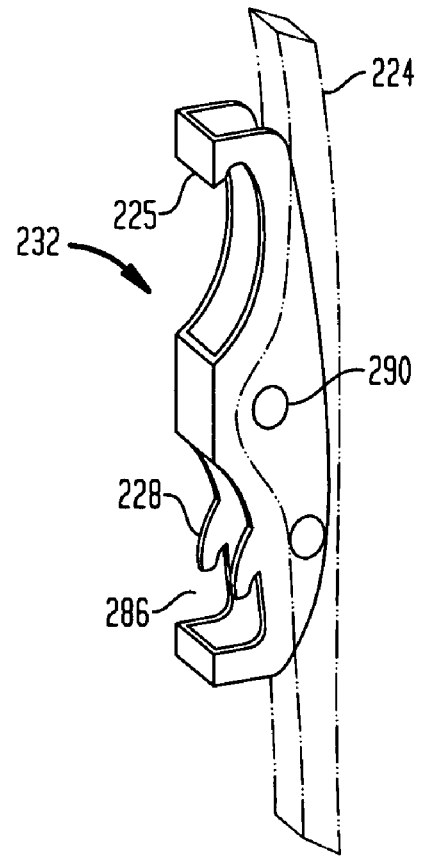

FIGS. 13, 14A and 14B show further views of the tilt adapter for the television mounting system shown in FIGS. 10A-12F. Referring to FIG. 13, tilt adapter 232 include hooks 225, 228 that secure the monitor arms 222, 224 to the respective top and bottom ledges 216, 218 of wall plate 102.

Referring to FIGS. 14A and 14B, tilt adapter 232 includes top hook 225 and bottom hook 228. The top hook 225 is adapted to engage the top ledge of the wall plate and the bottom hook 228 is adapted to engage the bottom ledge of the wall plate. The tilt adapter also includes C-shaped opening 286 provided below the bottom hook 228. The C-shaped opening accommodates the locking bar described above when the locking bar is in the closed position. The tilt adapter 232 also includes a slot 290 through which a tightening mechanism 292 may pass. The tilt adapter 232 also includes a pivot 294 extending through the monitor arm 224 and the tilt adapter 232. When the tightening mechanism 292 is loosened, the tilt adapter 232 may be pivoted about pivot 294 for tilting the monitor arm 224. When a desirable angle of tilt has been obtained, the tightening mechanism 292 may be tightened for securing the monitor arm 224 at a desired angle of tilt.

Figure 15A:
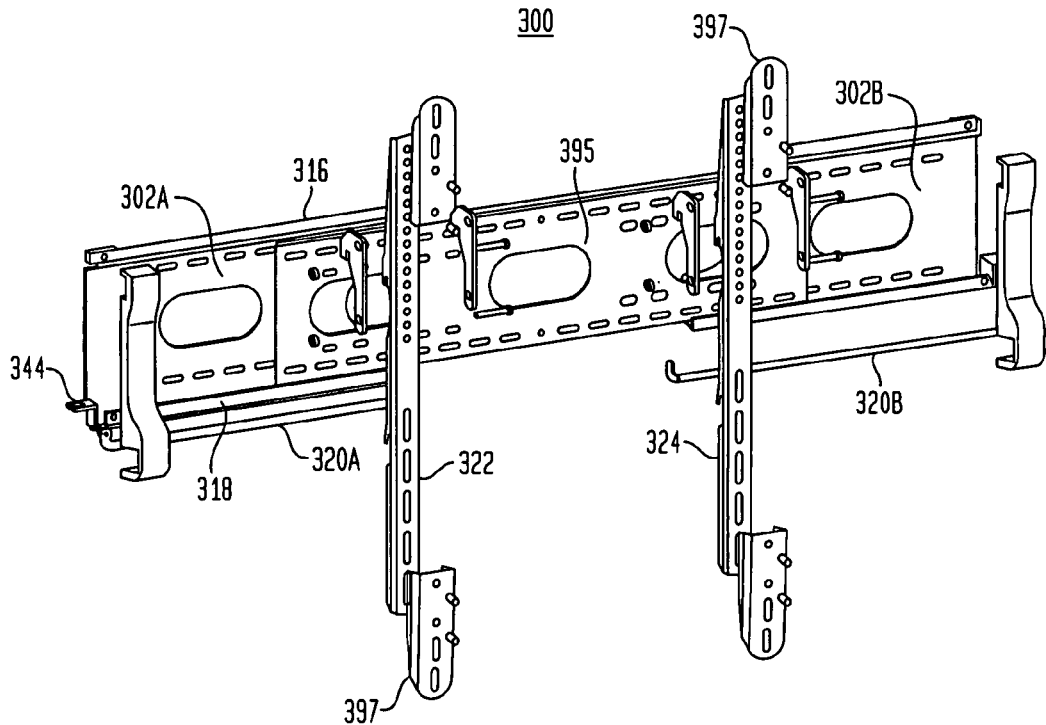
FIGS. 15A and 15B show an exploded view of an expandable television mounting system, in accordance with certain preferred embodiments of the present invention.
Figure 15B:
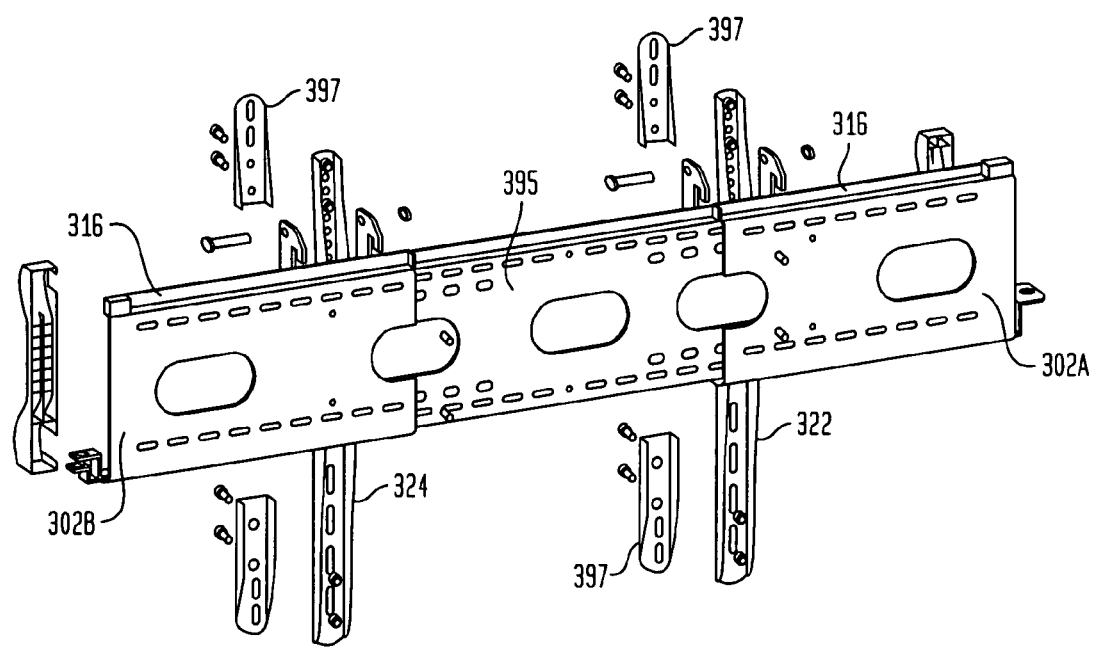

FIGS. 15A and 15B show a television mounting system 300, in accordance with another preferred embodiment of the present invention. Although a particular preferred embodiment is shown in FIGS. 15A and 15B, the television mounting system 300 may include one or more of the structural features of other embodiments shown and described herein. In the particular embodiment shown in FIGS. 15A and 15B, the wall plate includes a first wall plate 302A and a second wall plate 302B. Each wall plate 302A, 302B includes a top ledge 316 and a bottom ledge 318. The television mounting system 300 also includes a first locking bar 320A that is coupled with the first wall plate 302A and a second locking bar 320B that is coupled with the second wall plate 302B. The locking bars 320A, 320B are similar to the locking bars described above and may be pivoted from an unlocked position to a locked position. Each of the locking bars also includes the pad lock support 344 described above. The pad lock supports are desirably provided at the outer ends of the respective locking bars 320A, 320B.

The television mounting system 300 also preferably includes an expansion plate 395 that is provided between the first and second wall plates 302A, 302B. The expansion plate 395 enables the television mounting system 300 to be expanded and/or contracted to accommodate a television monitor having a particular size. For example, the television mounting system 300 shown in FIGS. 15A and 15B may be collapsed to accommodate a smaller television monitor and may be expanded to accommodate a larger television monitor. The first and second wall plates 302A and 302B and the expansion plate 395 have a plurality of opening that may be aligned with one another and through which fasteners such as screws may pass for securing the wall plates and the expansion plate in a particular configuration. The fasteners may be removed for adjusting the size of the television mounting system and then passed once again through the openings for resecuring the wall plates 302A, 302B and the expansion plate 395 in a particular configuration. The television mounting system 300 also includes monitor arms 322 having one or more of the features described in other embodiments disclosed herein. In particular preferred embodiments shown in FIGS. 15A and 15B, the monitor arms 322, 324 are fixed relative to the wall plates 302A, 302B and may not be adjusted to a plurality of different tilt angles relative to the wall plates. The monitor arms also includes extensions 397 that may be secured to respective upper and lower ends of the monitor arms 322, 324 for extending the length of the monitor arms. As understood by those skilled in the art, the extensions 397 may be utilized for mounting a larger television monitor using the television mounting system disclosed herein.

Figure 16A:
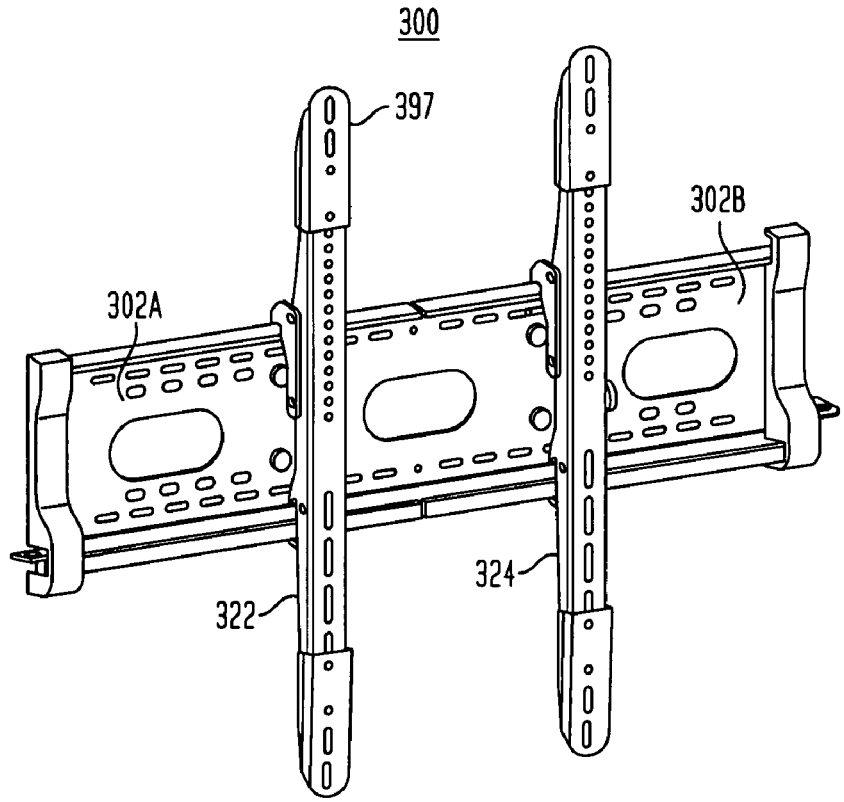
FIGS. 16A and 16B show the television mounting system of FIGS. 15A and 15B in an assembled configuration.
Figure 16B:
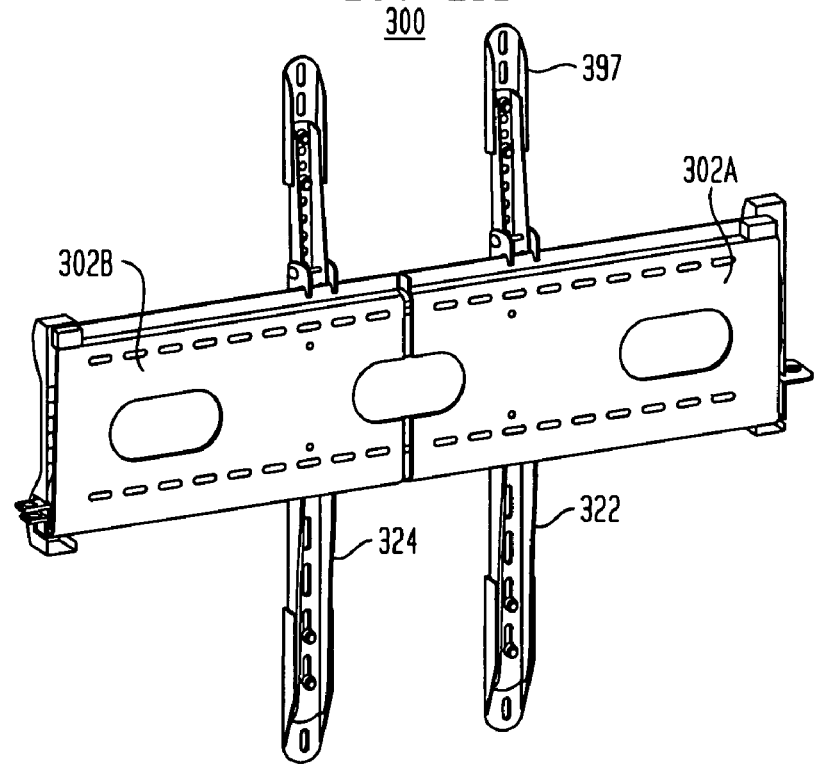

FIGS. 16A and 16B show the television mounting system 300 of FIGS. 15A and 15B after the monitor arms 322, 324 have been assembled with the wall plates 302A, 302B. Extensions 397 have been secured to upper and lower ends of the monitor arm 322, 324 for accommodating a larger sized television monitor. In the particular embodiment shown in FIGS. 16A and 16B, the television mounting system 300 is in a collapsed configuration so that the wall plates 302A, 302B have not been extended away from one another.

FIGS. 17A-17D show the expandable television mounting system of FIGS. 15A-16B. The television mounting system 300 includes wall plates 302A, 302B in the collapsed or unextended position. Monitor arms 322, 324 are secured to the wall plates 302A, 302B using hooks provided on the monitor arms. Referring to FIGS. 17A and 17B, the television mounting system includes a first locking bar 320A underlying the first wall plate 302A and a second locking bar 302B underlying the second wall plate 302B. The locking bars are movable (e.g. pivotable) between unlocked and locked position. As noted above, in the locked positions, the locking bars prevent the monitor arms 322, 324 from being lifted off from their engagement with the respective first and second wall plates 302A, 302B.

FIGS. 17E and 17F show monitor arms 322, 324 secured to the respective first and second wall plates 302A, 302B. Each of the respective monitor arms 322, 324 has a tilt adapter 332 secured thereto for changing the angle of tilt of the monitor arms. The tilt adapter 322 is a fixed tilt adapter so that the tilt may not be changed after the monitor arms have been secured to the wall plates 302A, 302B.

Figure 18A:
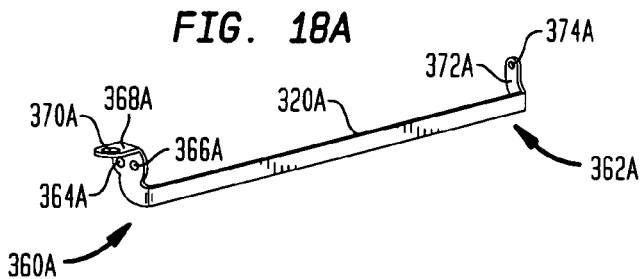
FIGS. 18A and 18B show locking bars for use with the expandable television mounting system shown in FIGS. 16A and 16B.

FIG. 18A shows the first locking bar 320A that is coupled with the first wall plate (FIG. 17A). The first locking bar 320A includes a first end 360 and a second end 362 remote therefrom. Both the first and second ends 360, 362 are preferably pivotally connected to a lower end of the first wall plate and are able to move between the unlocked and locked positions. The first locking bar 320A includes a first opening 364 for receiving a fastener and a second opening 366 for receiving a rotatable screw for rotating the locking bar between the unlocked and locked positions. The first end 360 also includes a flange 368 having an opening 370 extending therethrough. The second end 362 of the locking bar 320A has a flange 372 and an opening 374 extending through the flange. The opening 374 is pivotally connected to the first wall plate.

Figure 18B:
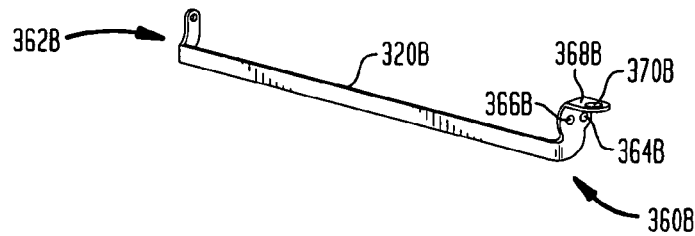

Referring to FIG. 18B, the television mounting system also includes a second locking bar 320B having a first end 360B and a second end 362B. The first end 360B includes a first opening 364B for receiving a threaded fastener and a second opening 366B adapted to receive a rotatable screw for rotating the second locking bar 320B between unlocked and locked positions. The second locking bar 320B also includes a flange 368B having an opening 370B extending therethrough. When the first and second locking bars 320A, 320B are pivotally connected to the respective first and second wall plates, the second ends 362A, 362B are closer to each other and the first ends 360A and 360B are further away from each other.

Figure 19A:
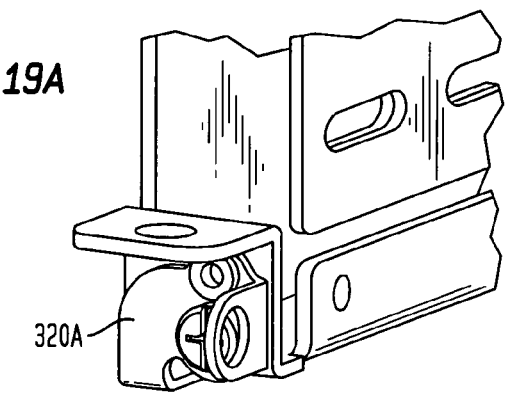
FIG. 19A shows a first locking bar of the television locking system of FIG. 16A in an unlocked position.
Figure 19B:
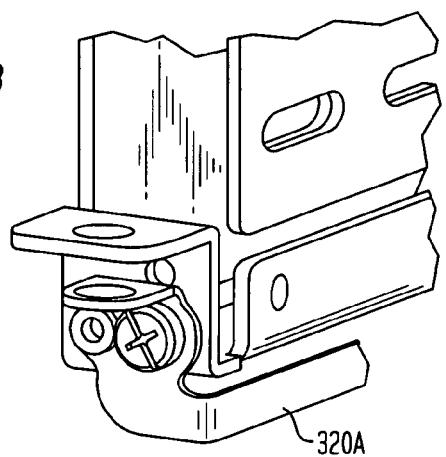
FIG. 19B shows the first locking bar of FIG. 19A in a locked position.

Referring to FIGS. 19A and 19B, the first locking bar 320A is movable between an unlocked position shown in FIG. 19A and a locked position shown in FIG. 19B. FIGS. 19A and 19B show the first locking bar. The second locking bar, located on the opposite side of the television mounting system, has a similar pivoting and locking arrangement as shown in FIGS. 19A and 19B.

Figure 20:
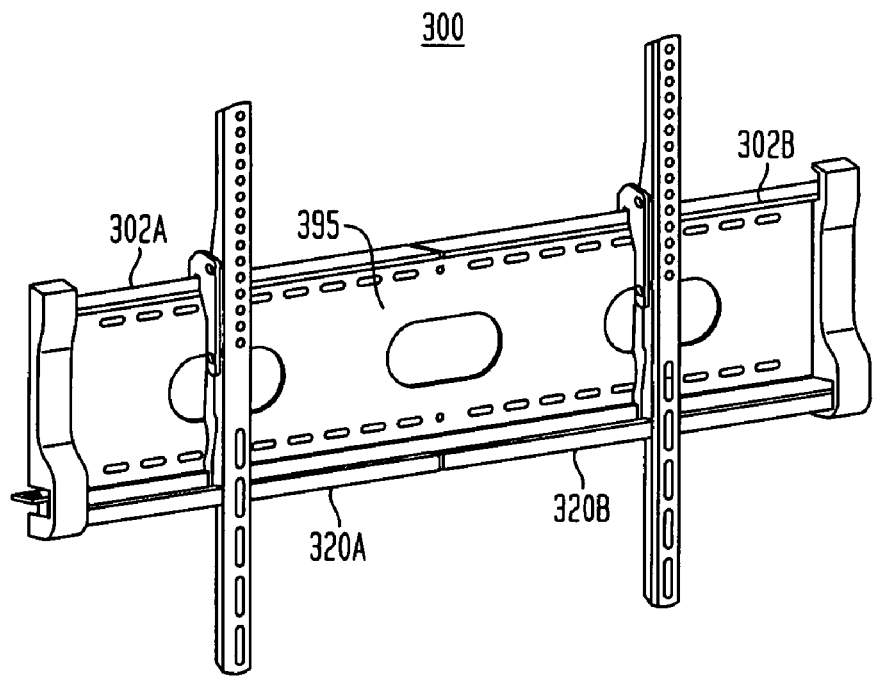
FIG. 20 shows another view of the expandable television mounting system shown in FIG. 16A.

FIG. 20 shows the expandable television mounting system 300 shown in FIGS. 17A-17F. The television system includes first wall plate 302A, second wall plate 302B and expansion plate 395 disposed between the first and second wall plates. The first and second wall plates may be pulled away from one another for expanding the size of the system. The first and second wall plates are coupled with the expansion plates 395 and may slide away from one another for expanding the size of the system. First locking bar 320A is pivotally coupled to a lower end of the first wall plate 302A. Second locking bar 320B is pivotally connected to a lower end of the second wall plate 302B.

Figure 21:
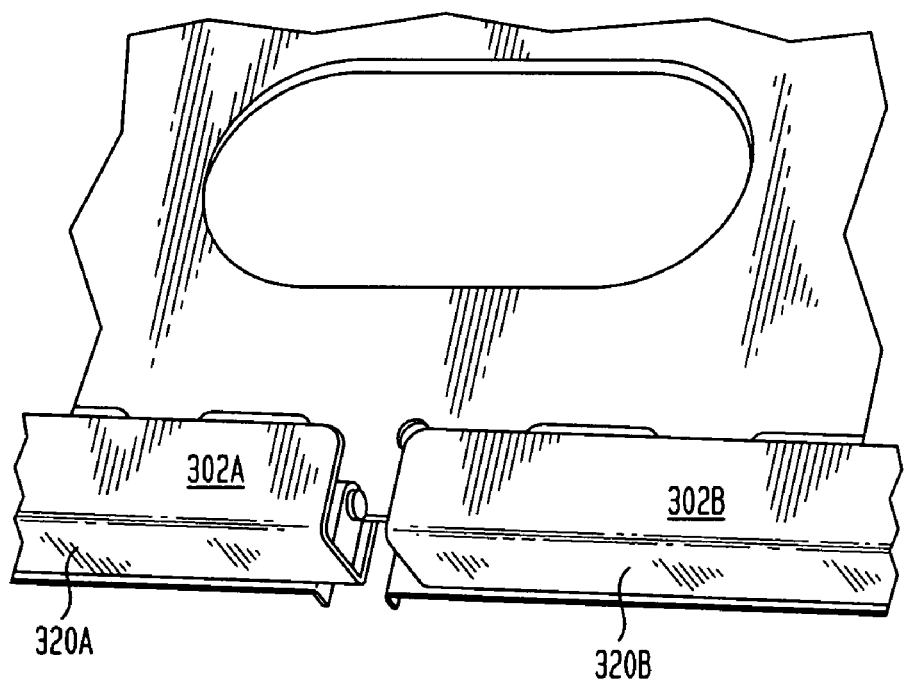
FIG. 21 shows an expanded view of a portion of the expandable television mounting system shown in FIG. 20.

FIG. 21 shows the first locking bar 320A and the second locking bar 320B that underlie the first and second wall plates. The first locking bar 320A is pivotally connected to the first wall plate 302A and the second locking bar 320B is pivotally connected to the second wall plate 302B.

Figure 22:
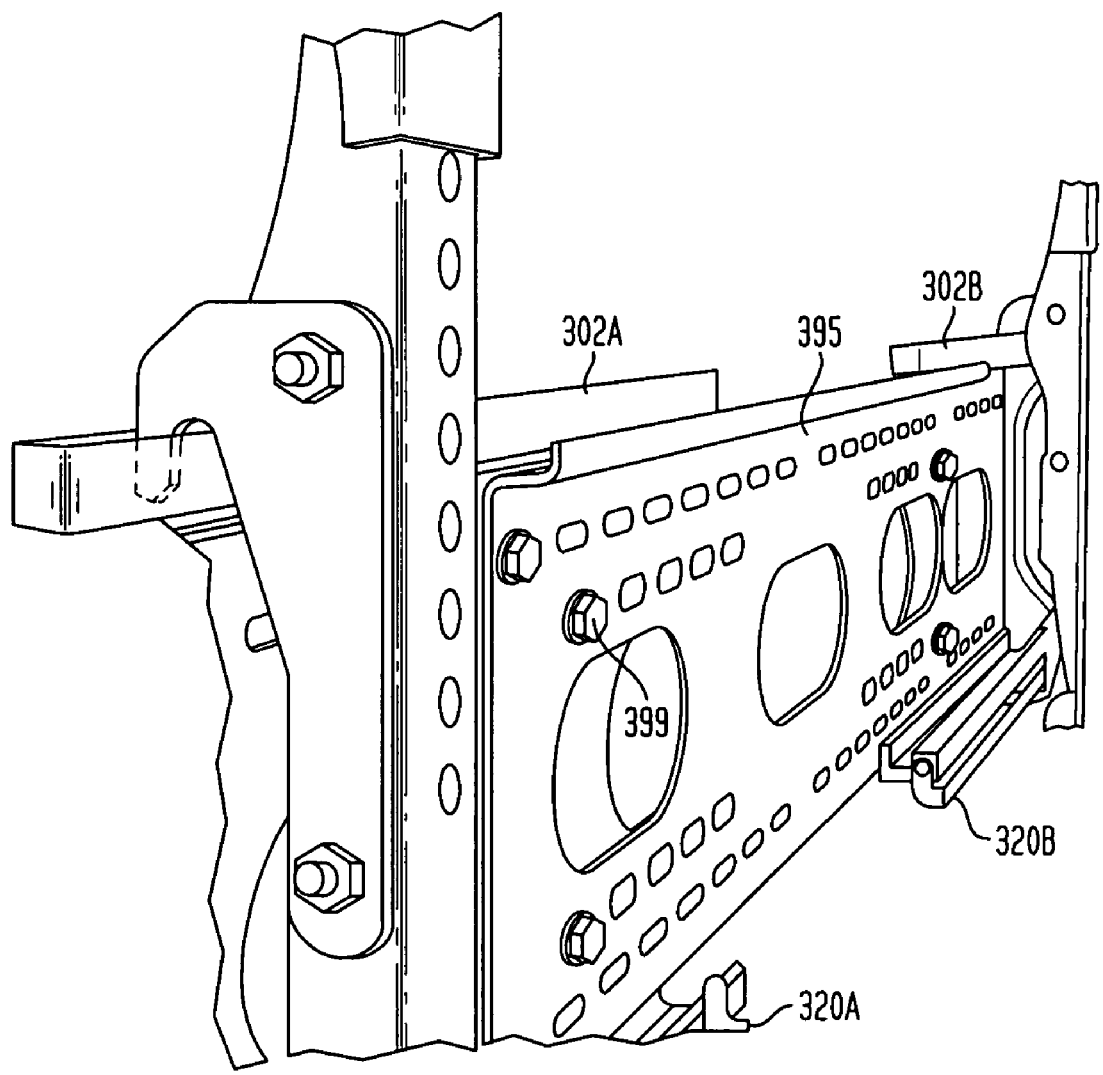
FIG. 22 shows a side perspective view of the television mounting system of FIG. 20 in an expanded configuration.

FIG. 22 shows the television mounting system 300 in an expanded configuration with first wall plate 302A separated from second wall plate 302B, but coupled together by expansion plate 395. Fasteners are passed through openings in the wall plates and the expansion plate for securing the expansion plate and the wall plates together. As shown in FIG. 22, because the system is in an expanded configuration, the first locking bar 320A is spaced from the second locking bar 320B.

Figure 23A:
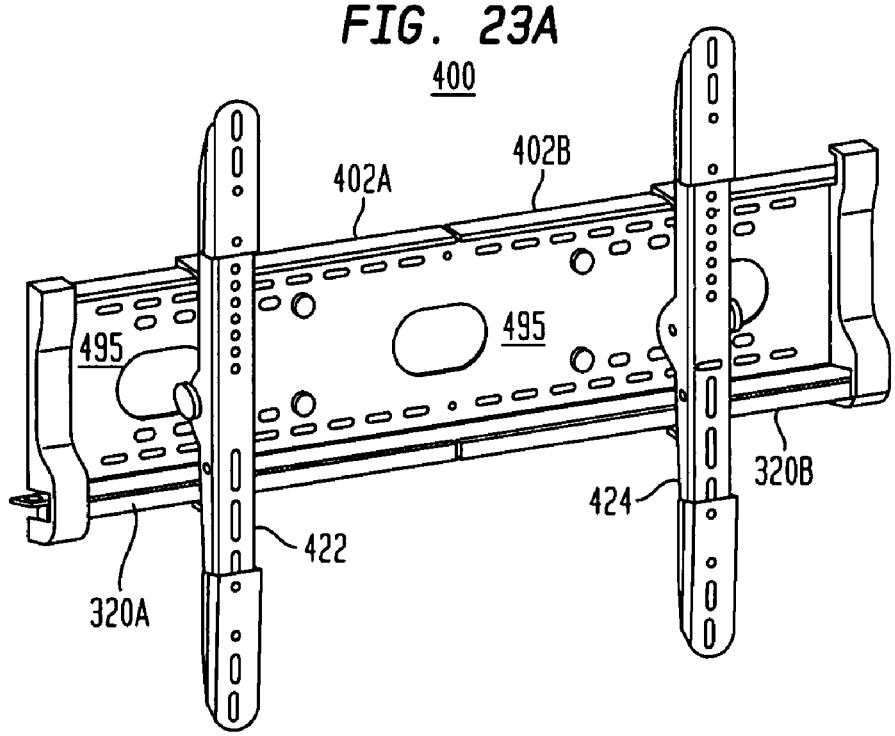
FIGS. 23A and 23B show an expandable television mounting system having tiltable monitor arms, in accordance with certain preferred embodiments of the present invention.
Figure 23B:
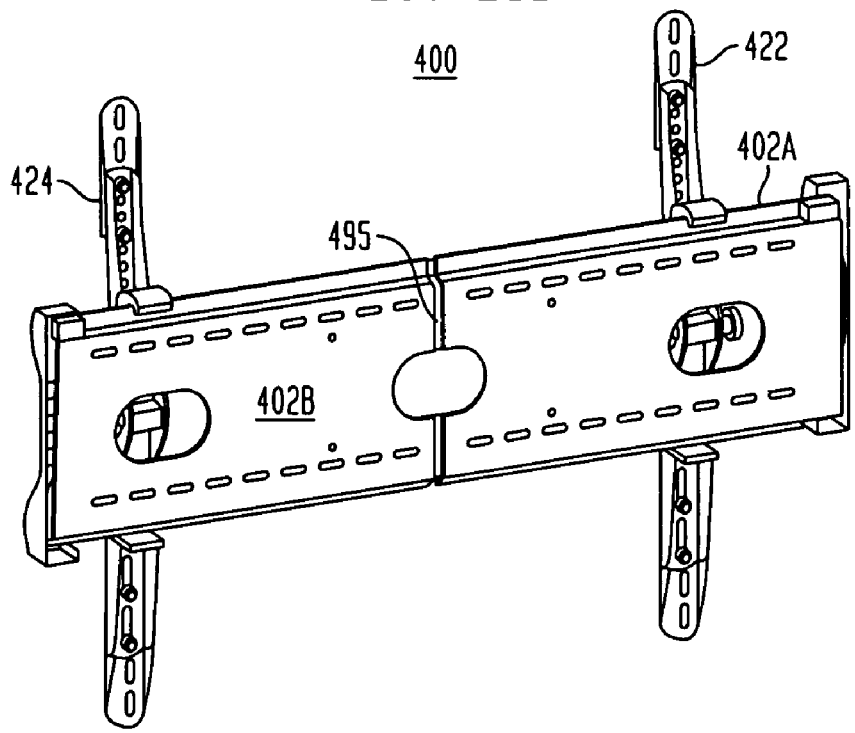

Referring to FIGS. 23A and 23B, in accordance with certain preferred embodiments of the present invention, a television mounting system 400 combines the tiltable monitor arms of the embodiment shown in FIG. 12A with the expandable structure shown in the embodiment of FIG. 15A. The system 400 includes a first wall plate 402A and a second wall plate 402B that are coupled together by an expansion plate 495. As described above, the expansion plate 495 enables the first and second wall plates to be collapsed and expanded relative to each other. In FIGS. 23A and 23B, the system is in its collapsed configuration with the wall plates 402A and 402B adjacent one another.

The television mounting system 400 also includes a first locking bar 320A pivotally connected a lower end of the first wall plate 402A and a second locking bar 320B pivotally connected to a lower end of the second wall plate 402B.

The television mounting system also includes monitor arms 422 and 424. Each of the monitor arms has the tilting mechanism shown in and described above in conjunction with the embodiment of FIG. 11A. As a result, the monitor arms 422 and 424 may be tilted at selected angles relative to a front face of the first and second wall plates.

Figure 24:
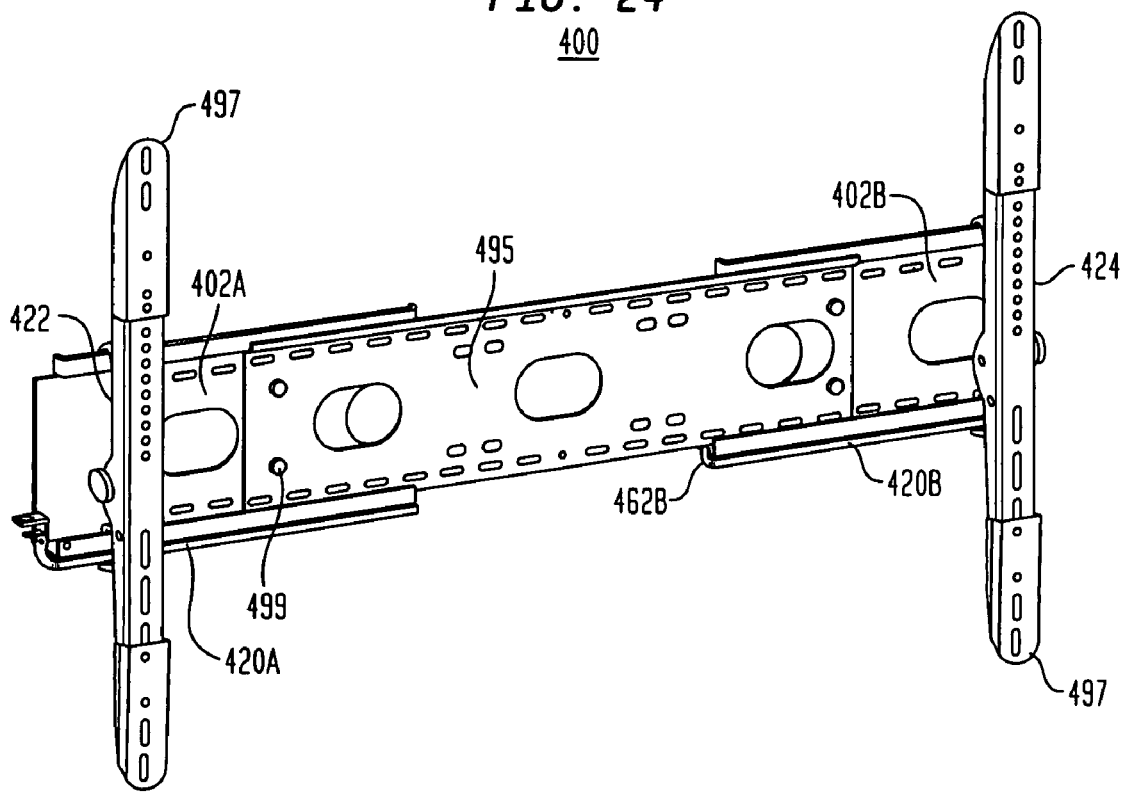
FIG. 24 shows the expandable television mounting system of FIGS. 23A and 23B in an expanded configuration.

FIG. 24 shows the television mounting system 400 of FIG. 23A with the first and second wall plates 402A, 402B in an expanded configuration. The first and second wall plates are interconnected by expansion plate 495, which is secured to the first and second wall plates by fasteners 499. In the configuration shown in FIG. 24, the second ends 462A, 462B of the respective first and second locking bars 420A, 420B are spaced from one another. The television mounting system also includes arm extensions 497 secured to upper and lower ends of the mounting arms 422, 424 for increasing the height of the mounting arms. Thus, the embodiment shown in FIG. 24 is versatile and may attach television monitors of various sizes to a wall. If a smaller television monitor is attached to a wall, the first and second wall plates 402A, 402B may be collapsed together and the extensions 497 removed from the monitor arms 422, 424. If a larger television monitor is attached to the system, the first and second wall plates may be moved away from one another, while remaining coupled together by the expansion plate 495. If the television monitor is even larger, the extension arms 497 may be attached to the upper and lower ends of the monitor arms 422, 424. If it is desirable to change the tilt of the television monitor, the tilting adapter on the monitor arms may be loosened and the monitor arms tilted to a desired angle of tilt. When the desired angle of tilt has been obtained, the tilting mechanism may be tightened for securing the television monitor at the selected tilt angle.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A television mounting system comprising:
   a wall plate;
   at least one monitor arm mountable on said wall plate; and
   a locking element connected with said wall plate and being rotatable between an unlocked position for enabling dismounting of said at least one monitor arm from said wall plate and a locked position for preventing dismounting of said at least one monitor arm from said wall plate, wherein said locking element comprises a locking bar positioned adjacent a lower end of said wall plate.

2. The system as claimed in claim 1, further comprising a rotating element coupled with said locking element, said rotating element including at least one groove engageable by a tool for rotating said locking element between the unlocked and locked positions.

3. A television mounting system comprising:
   a wall plate;
   at least one monitor arm mountable on said wall plate;
   a locking element connected with said wall plate and being rotatable between an unlocked position for enabling dismounting of said at least one monitor arm from said wall plate and a locked position for preventing dismounting of said at least one monitor arm from said wall plate;
   a first flange attached to said locking element, said first flange having an opening extending therethrough; and
   a second flange attached to said wall plate, said second flange having an opening extending therethrough, wherein the openings in said first and second flanges are aligned when said locking element is in the locked position and the openings in said first and second flanges are not aligned when said locking element is in the unlocked position.

4. The system as claimed in claim 3, further comprising a lock passable through the aligned openings in said first and second flanges when said locking element is in the locked position.

5. A television mounting system comprising:
   a wall plate;
   at least one monitor arm mountable on said wall plate;
   a locking element connected with said wall plate and being rotatable between an unlocked position for enabling dismounting of said at least one monitor arm from said wall plate and a locked position for preventing dismounting of said at least one monitor arm from said wall plate;
   a first fastener opening extending through said locking element;
   a second fastener opening coupled with said wall plate and aligned with the first fastener opening when said locking element is in the unlocked position; and
   a third fastener opening coupled with said wall plate, spaced from said second fastener opening and aligned with the first fastener opening when said locking element is in the locked position.

6. The system as claimed in claim 5, further comprising a fastener insertable into the first and second fastener openings when said locking element is in the unlocked position and insertable into the first and third fastener openings when said locking element is in the locked position.

7. The system as claimed in claim 1, wherein said at least one monitor arm comprises at least one hook engageable with said wall plate for mounting said at least one monitor arm on said wall plate.

8. The system as claimed in claim 7, wherein said at least one monitor arm comprises a second hook engageable with said wall plate for securing said at least one monitor arm on said wall plate.

9. The system as claimed in claim 1, wherein said wall plate is expandable in size.

10. The system as claimed in claim 9, wherein said wall plate comprises:
    a first wall plate section;
    a second wall plate section; and
    an expansion plate coupling said first and second wall plate sections together, wherein said first and second wall plate sections are movable away from one another for expanding the size of said wall plate and movable toward one another for reducing the size of said wall plate.

11. The system as claimed in claim 10, wherein said locking element comprises a first locking bar coupled with said first wall plate section and a second locking bar coupled with said second wall plate section.

12. The system as claimed in claim 10, wherein said first and second wall plate sections slidably engage said expansion plate when moving relative to one another.

13. The system as claimed in claim 1, wherein said at least one monitor arm includes a tilt adjustment mechanism for selectively adjusting the tilt of said at least one monitor arm relative to a front face of said wall plate.

14. The system as claimed in claim 1, wherein said at least one monitor arm includes fastener openings extending therethrough and said system further comprises fasteners insertable into said fastener openings for securing said at least one monitor arm to a television monitor.

15. The system as claimed in claim 1, further comprising at least one extension that is attachable to said at least one monitor arm for extending the length of said at least one monitor arm.

16. A television mounting system comprising:
    a wall plate having an upper end and a lower end;
    a locking bar pivotally mounted to said wall plate, said locking bar being rotatable between a locked position and an unlocked position, wherein said locking bar is positioned adjacent the lower end of said wall plate; and
    at least one monitor arm mountable on said wall plate, wherein in the locked position said locking bar prevents dismounting of said at least one monitor arm from said wall plate.

17. The system as claimed in claim 16, wherein said at least one monitor arm includes a tilt adjustment mechanism for selectively adjusting the tilt of said at least one monitor arm relative to said wall plate.

18. The system as claimed in claim 16, wherein said wall plate comprises a first wall plate section, a second wall plate section and an expansion plate that couples said first and second wall plate sections together, and wherein said first and second wall plate sections are movable away from one another for expanding the size of said wall plate.

19. The system as claimed in claim 18, wherein said at least one monitor arm comprises a first monitor arm mountable on said first wall plate section and a second monitor arm mountable on said second wall plate section.

20. The system as claimed in claim 19, wherein said locking bar is pivotally mounted to said first wall plate section, said system further comprising a second locking bar pivotally mounted to said second wall plate section.

21. The system as claimed in claim 16, wherein said at least one monitor arm comprises a first hook, a second hook spaced from said first hook and a C-shaped opening underlying said second hook, wherein said locking bar engages the C-shaped opening underlying said second hook when said locking bar is in the locked position for preventing dismounting of said at least one monitor arm from said wall plate.

22. The system as claimed in claim 21, wherein said wall plate comprises a top ledge adjacent an upper end of said wall plate and a bottom ledge adjacent a lower end of said wall plate, wherein said first hook is engageable with said top ledge and said second hook is engageable with said bottom ledge.

23. The system as claimed in claim 3, further comprising a rotating element coupled with said locking element, said rotating element including at least one groove engageable by a tool for rotating said locking element between the unlocked and locked positions.

24. The system as claimed in claim 5, further comprising a rotating element coupled with said locking element, said rotating element including at least one groove engageable by a tool for rotating said locking element between the unlocked and locked positions.

25. The system as claimed in claim 3, wherein said at least one monitor arm comprises at least one hook engageable with said wall plate for mounting said at least one monitor arm on said wall plate.

26. The system as claimed in claim 5, wherein said at least one monitor arm comprises at least one hook engageable with said wall plate for mounting said at least one monitor arm on said wall plate.

27. The system as claimed in claim 3, wherein said wall plate is expandable in size.

28. The system as claimed in claim 5, wherein said wall plate is expandable in size.

29. The system as claimed in claim 3, wherein said at least one monitor arm includes a tilt adjustment mechanism for selectively adjusting the tilt of said at least one monitor arm relative to a front face of said wall plate.

30. The system as claimed in claim 5, wherein said at least one monitor arm includes a tilt adjustment mechanism for selectively adjusting the tilt of said at least one monitor arm relative to a front face of said wall plate.

31. The system as claimed in claim 3, wherein said at least one monitor arm includes fastener openings extending therethrough and said system further comprises fasteners insertable into said fastener openings for securing said at least one monitor arm to a television monitor.

32. The system as claimed in claim 5, wherein said at least one monitor arm includes fastener openings extending therethrough and said system further comprises fasteners insertable into said fastener openings for securing said at least one monitor arm to a television monitor.

33. The system as claimed in claim 3, further comprising at least one extension that is attachable to said at least one monitor arm for extending the length of said at least one monitor arm.

34. The system as claimed in claim 5, further comprising at least one extension that is attachable to said at least one monitor arm for extending the length of said at least one monitor arm.

* * * * *